Dec. 15, 1959  A. F. HUDSON  2,916,858
CONTOUR FORMING MACHINE
Filed July 18, 1958  8 Sheets-Sheet 1
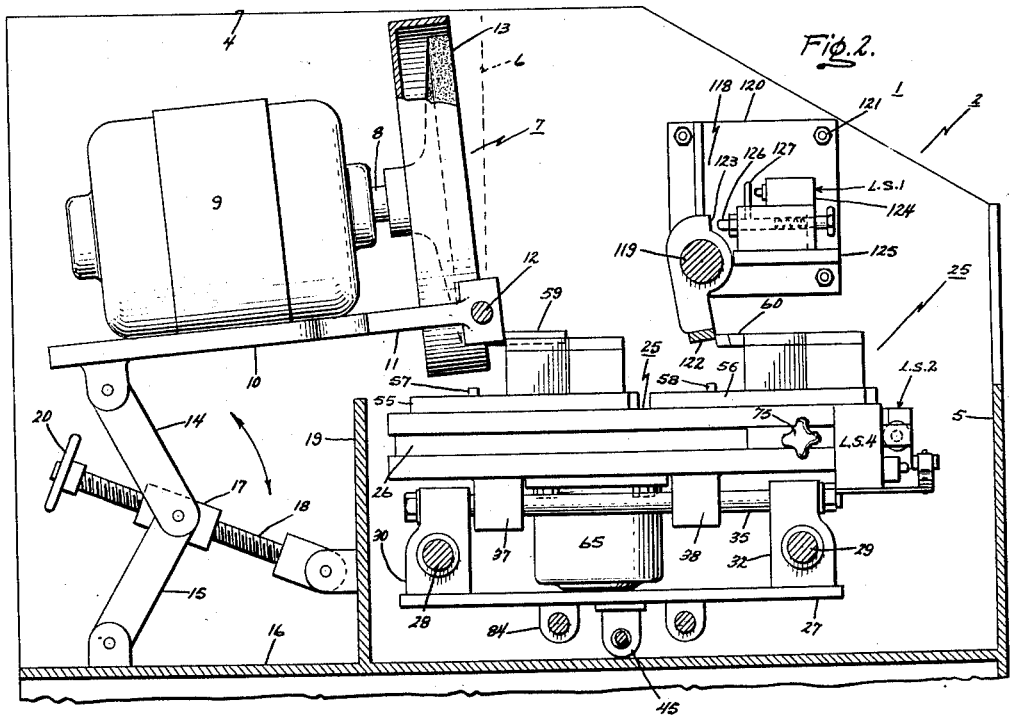
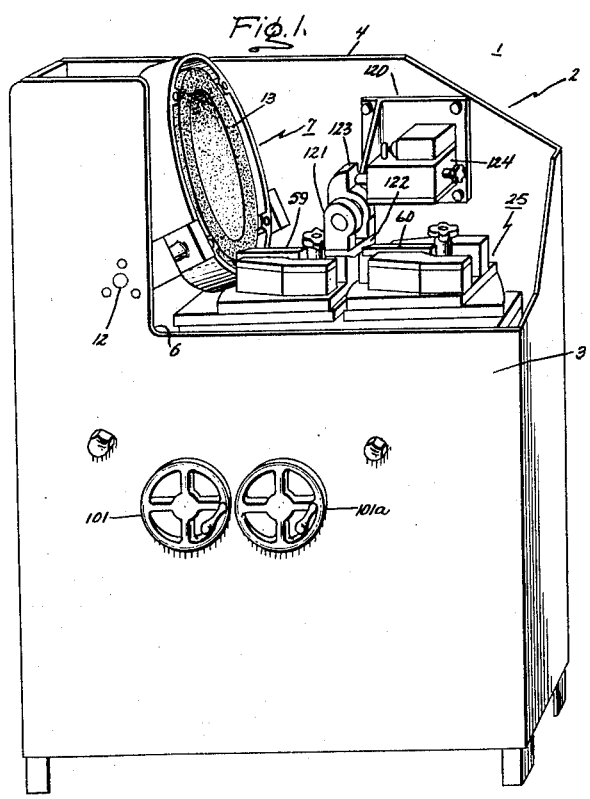
Inventor:
Arthur F. Hudson,
by Hurst + Irish
Attorneys.

Dec. 15, 1959    A. F. HUDSON    2,916,858
CONTOUR FORMING MACHINE
Filed July 18, 1958    8 Sheets-Sheet 2
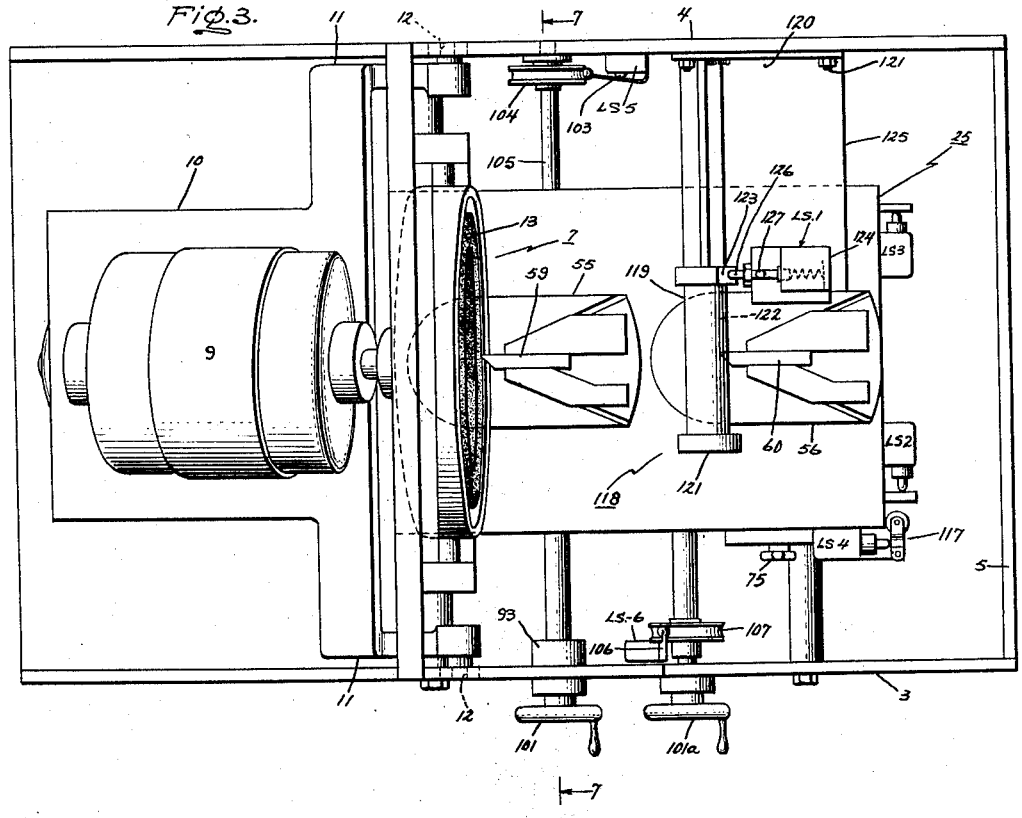

Dec. 15, 1959  A. F. HUDSON  2,916,858
CONTOUR FORMING MACHINE
Filed July 18, 1958  8 Sheets-Sheet 3

Inventor:
Arthur F. Hudson,
by Just & Irish
Attorneys.

Dec. 15, 1959 A. F. HUDSON 2,916,858
CONTOUR FORMING MACHINE
Filed July 18, 1958 8 Sheets-Sheet 4
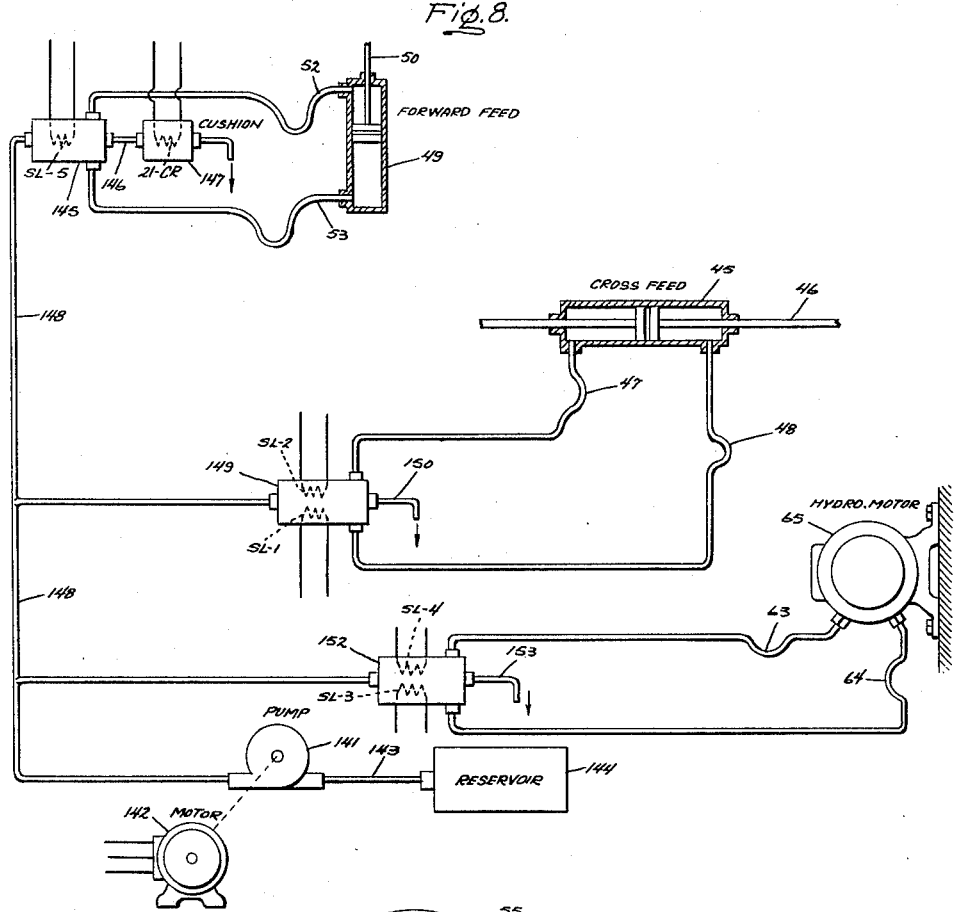
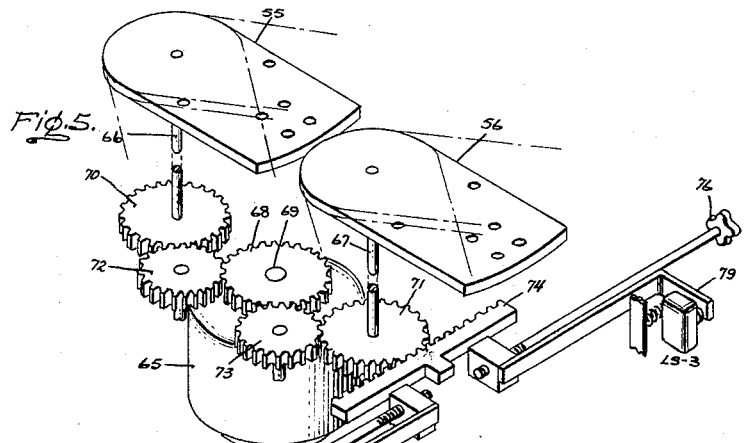
Inventor:
Arthur F. Hudson,
by Gust & Irish
Attorneys.

Dec. 15, 1959  A. F. HUDSON  2,916,858
CONTOUR FORMING MACHINE
Filed July 18, 1958  8 Sheets-Sheet 5
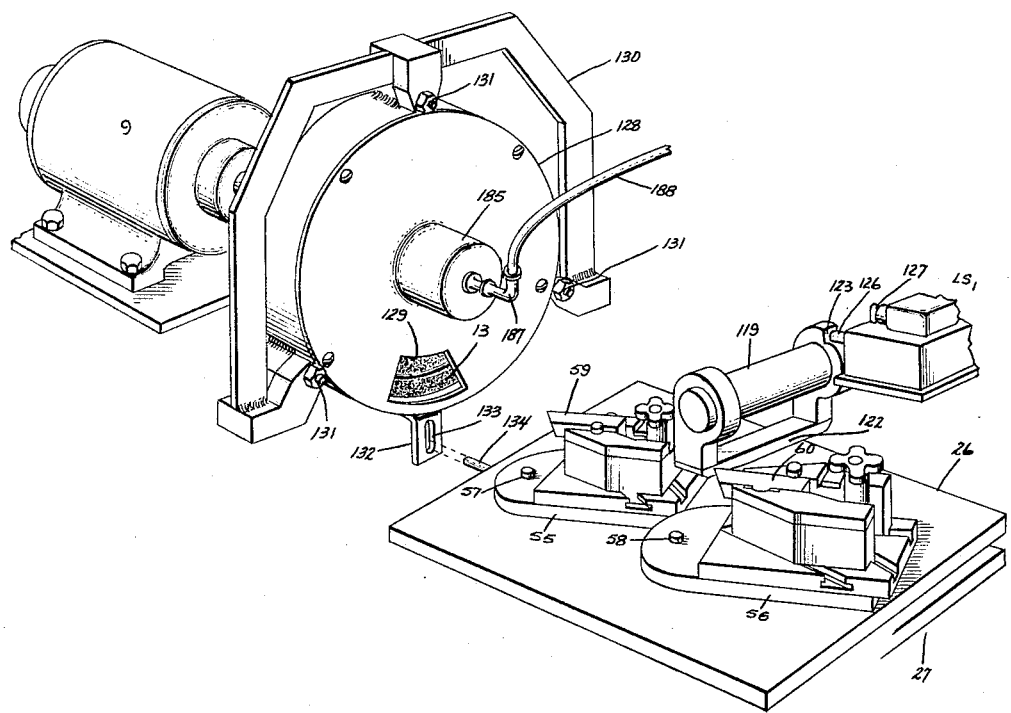
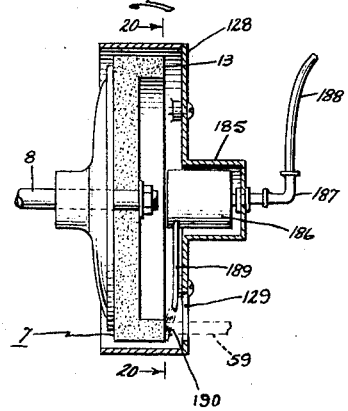
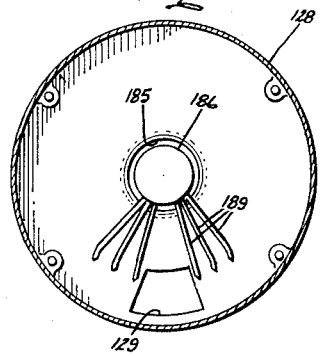
Inventor:
Arthur F. Hudson,
by Just & Dish
Attorneys.

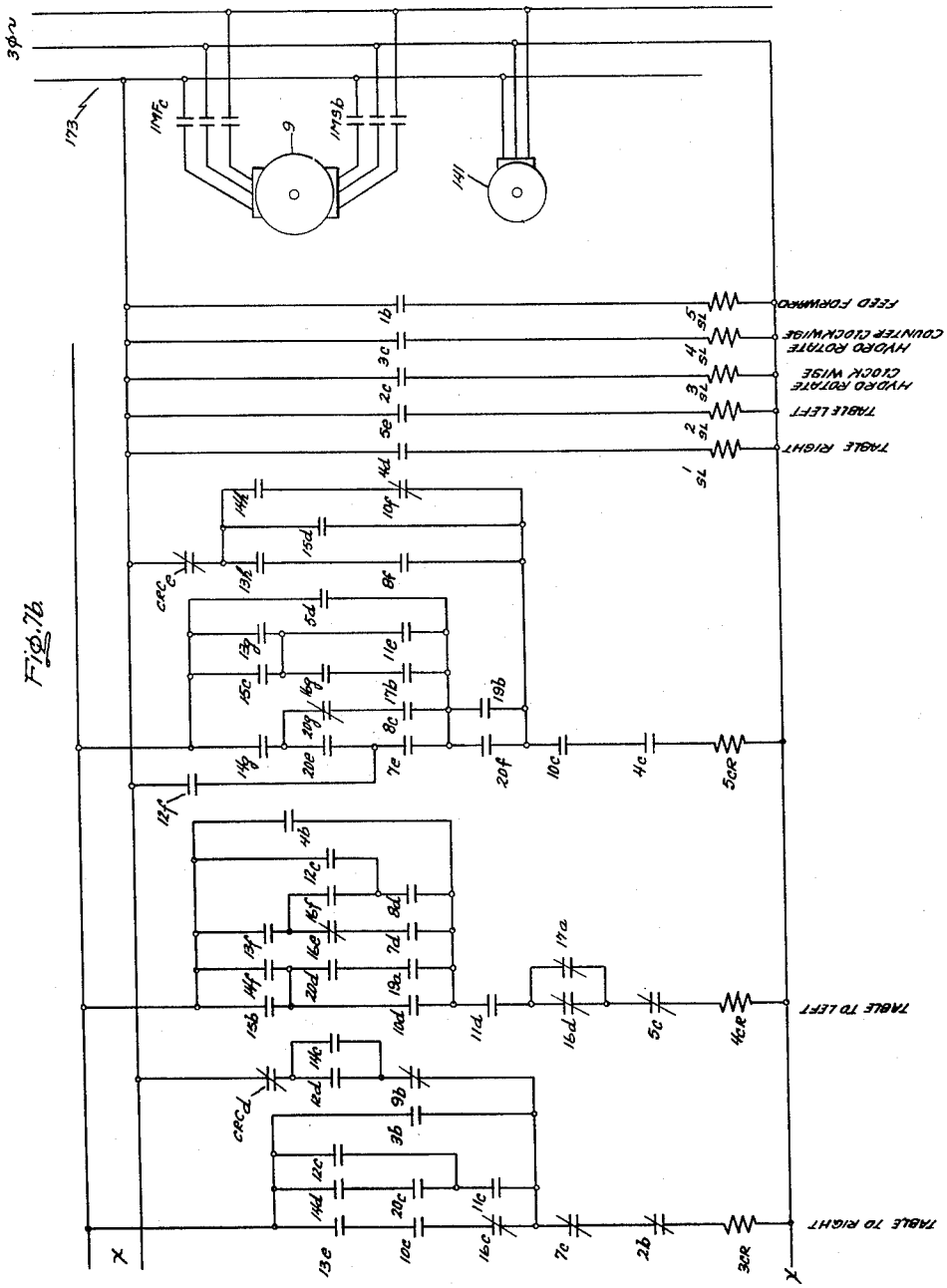

Dec. 15, 1959  A. F. HUDSON  2,916,858
CONTOUR FORMING MACHINE
Filed July 18, 1958  8 Sheets-Sheet 8
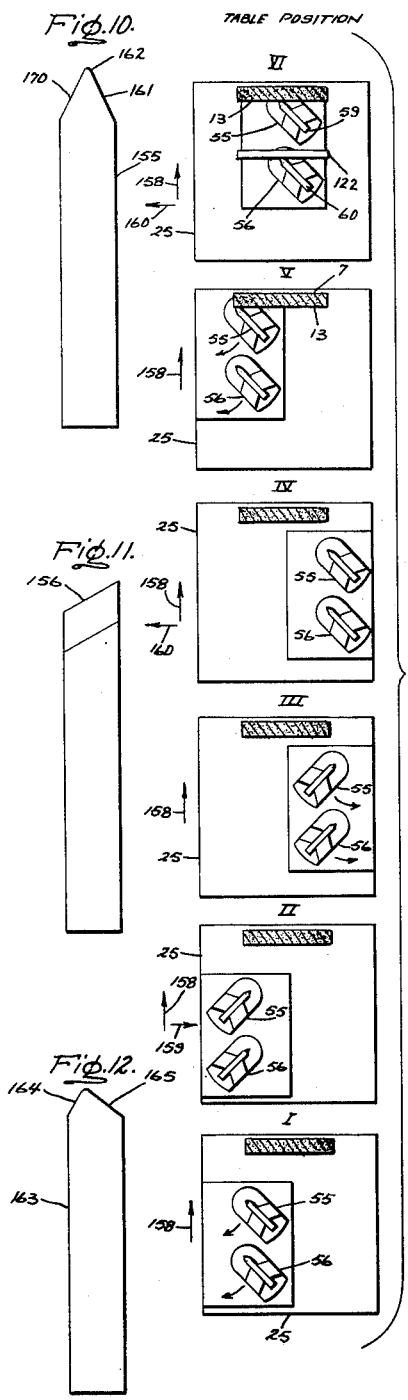
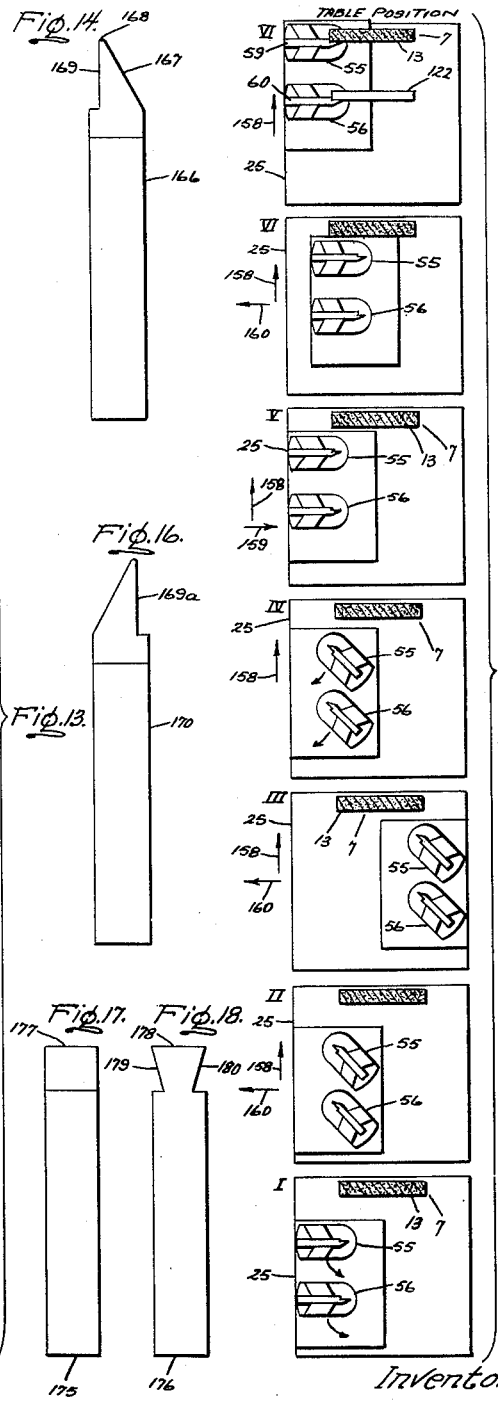
Inventor:
Arthur F. Hudson,
by Just & Drish
Attorneys.

United States Patent Office 2,916,858
Patented Dec. 15, 1959

2,916,858

CONTOUR FORMING MACHINE

Arthur F. Hudson, Huntington, Ind.

Application July 18, 1958, Serial No. 749,455

29 Claims. (Cl. 51—127)

This invention relates generally to contour forming machinery, particularly of the metal working type, and finds particular utility in an automatic contour grinding machine for single point cutting tools.

Single point metal cutting tools are widely used in the metal working industry in such machines as lathes, shapers, planers, etc., such tools now generally having at least their cutting portion formed of sintered carbide. Such tools require relatively frequent sharpening or grinding to restore their initial contour and to sharpen their cutting edges in order efficiently to use the desired cutting speed and to obtain the desired finish on the metal part being worked thereby. In the past, grinding of such single point metal cutting tools has commonly been manually performed by an operator using a conventional abrasive grinding wheel. In the particular case of carbide tools, manual grinding has not only required considerable time, but most particularly has required considerable skill and training on the part of the operator; the carbide from which metal cutting tools are now generally formed is extremely hard and quite brittle and improper grinding which does not result in sufficient heat dissipation from the tool can be expected to in turn result in heat checks or thermal shock in the tool, thus requiring that it be scrapped.

A single point form tool has a configuration usually consisting of an angle, a radius and another angle. It has been conventional practice to sharpen dulled carbide tools by first clearing the steel under the carbide portion with an aluminum oxide abrasive grinding wheel, grinding the steel portion of the tool to provide a relief angle about 2° greater than the relief angle to be ground in the carbide portion; this prevents the steel shank portion of the tool from loading the diamond grinding wheel in the subsequent finish grinding operation. After the steel shank portion of the tool has been cleared, the second step in conventional tool grinding practice is to set a vise, protractor, or other means for guiding the tool to be ground at the proper angle for grinding one angle of the carbide portion of the tool with a silicon carbide grinding wheel. Following grinding of the first angle of the carbide portion, the third conventional step is to reset the vise or protractor to grind the other angle of the carbide portion on the silicon carbide wheel. The fourth step has been to rough grind the radius on the silicon carbide wheel, leaving enough stock on the tool to permit the radius of the tool subsequently to be lapped on a diamond wheel. After both angles and the radius of the carbide portion of the tool have been rough ground on a silicon carbide wheel, the tool is then finish ground on a medium coarse diamond wheel, it being necessary to take care to blend both angles into the correct size radius and to maintain the center line of the radius in proper relation to whichever side of the radius center line is dimensioned from. The sixth and last operation generally required to finish the form tool is to lap the finished ground form on a fine diamond wheel so as to obtain a low microfinish on the carbide portion of the tool in order to extend the life of the tool for each sharpening.

While automatic and semi-automatic type tool grinding machines have been proposed, to the best of the present applicant's knowledge such machines have not found general commercial acceptance due generally to their set up complexity, lack of flexibility, time consumption in operation, requirement for highly skilled operators, and unsatisfactory grinding action. It is therefore desirable to provide a single point cutting tool grinding machine which will automatically and rapidly rough and finish grind and lap the tool, holding close tolerances, causing minimum shock to the metal of which the tool is formed, and provide a satisfactory resultant finish. It is further desirable that such a machine be flexible, i.e., capable of grinding tools having several different cutting configurations, that maximum grinding wheel life be provided, and that minimum experience and training be needed for operation of the machine. It is of course additionally desirable that such a machine be comparatively simple both in its mechanical construction and in its control.

It is accordingly an object of my invention to provide an improved contour forming metal working machine.

Another object of my invention is to provide an improved contour forming metal working machine with automatic programming of transverse side-to-side, longitudinal forward and rearward, and pivotal motions of the work piece with respect to a metal working wheel.

A further object of my invention is to provide an improved automatic contour grinding machine for single point cutting tools.

A still further object of my invention is the provision of an improved automatic contour grinding machine for single point metal cutting tools incorporating the desirable features enumerated above.

Further objects and advantages of my invention will become apparent by reference to the following description and the accompanying drawings, and the features of novelty which characterize this invention will be pointed out in the claims annexed to and forming a part of this specification.

My invention, in its broader aspects, provides a contour forming machine including a stock-removing wheel, which may be an abrasive grinding wheel, with means operatively connected thereto for driving the same. Work-supporting means, such as a table assembly is provided with means for moving the same transversely from side-to-side and longitudinally toward and away from the wheel. At least one work piece holding fixture is pivotally mounted on the table with means being provided for pivoting the same in either direction and means are further provided for limiting the removal of stock from the work piece by the wheel to a predetermined amount. More particularly, my invention contemplates means for automatically programming the transverse and longitudinal movements of the table and the pivoting of the work piece holding fixture to provide the requisite contour on the piece being worked upon by the wheel. In the preferred embodiment of my invention, as applied to an automatic single point cutting tool grinding machine, I provide a pair of work piece holding fixtures pivotally mounted on the table, one being adapted to hold the tool being ground with the other being adapted to hold a template tool, the two fixtures being simultaneously pivoted in either direction in equal arcs. Programming of the transverse side-to-side, the longitudinal forward and rearward motions of the table and the pivotal motion of the work piece holding fixtures is accomplished in the preferred embodiment of my invention by means of electrical limit switches arranged to be actuated in response to predetermined positions of the table and the fixtures, with automatic control means connecting the limit switches to the table and fixture moving means. The preferred embodiment of my invention also includes a two-speed motor driving the grinding wheel, the motor being operated at a lower speed during rough grinding and at a higher speed for polishing the tool for a predetermined brief period at the end of the grinding cycle.

In the drawings, Fig. 1 is a view in perspective of an automatic single point cutting tool grinding machine incorporating my invention;

Fig. 2 is a side elevational view, partly in cross-section, illustrating the grinding machine of Fig. 1;

Fig. 3 is a top view of the machine of Fig. 1;

Fig. 5 is a fragmentary view further illustrating the fixture pivoting assembly of the grinding machine of the previous figures;

Fig. 6 is a fragmentary view in perspective illustrating the addition of a guard on the grinding wheel of my improved machine;

Figs. 7a and 7b are schematic illustrations jointly showing the electrical control of my improved grinding machine;

Fig. 8 is a schematic illustration showing the hydraulic actuating system of the machine of the previous figures;

Fig. 9 is a fragmentary cross sectional view further illustrating the transverse motion stop and limit switch assembly of the preferred embodiment of my machine;

Fig. 10 is a top view showing one form of single point cutting tool which may be ground on my improved machine;

Fig. 11 is a side view of the tool shown in Fig. 10;

Fig. 12 is a top view showing a modified form of the tool of Figs. 10 and 11;

Figure 4:
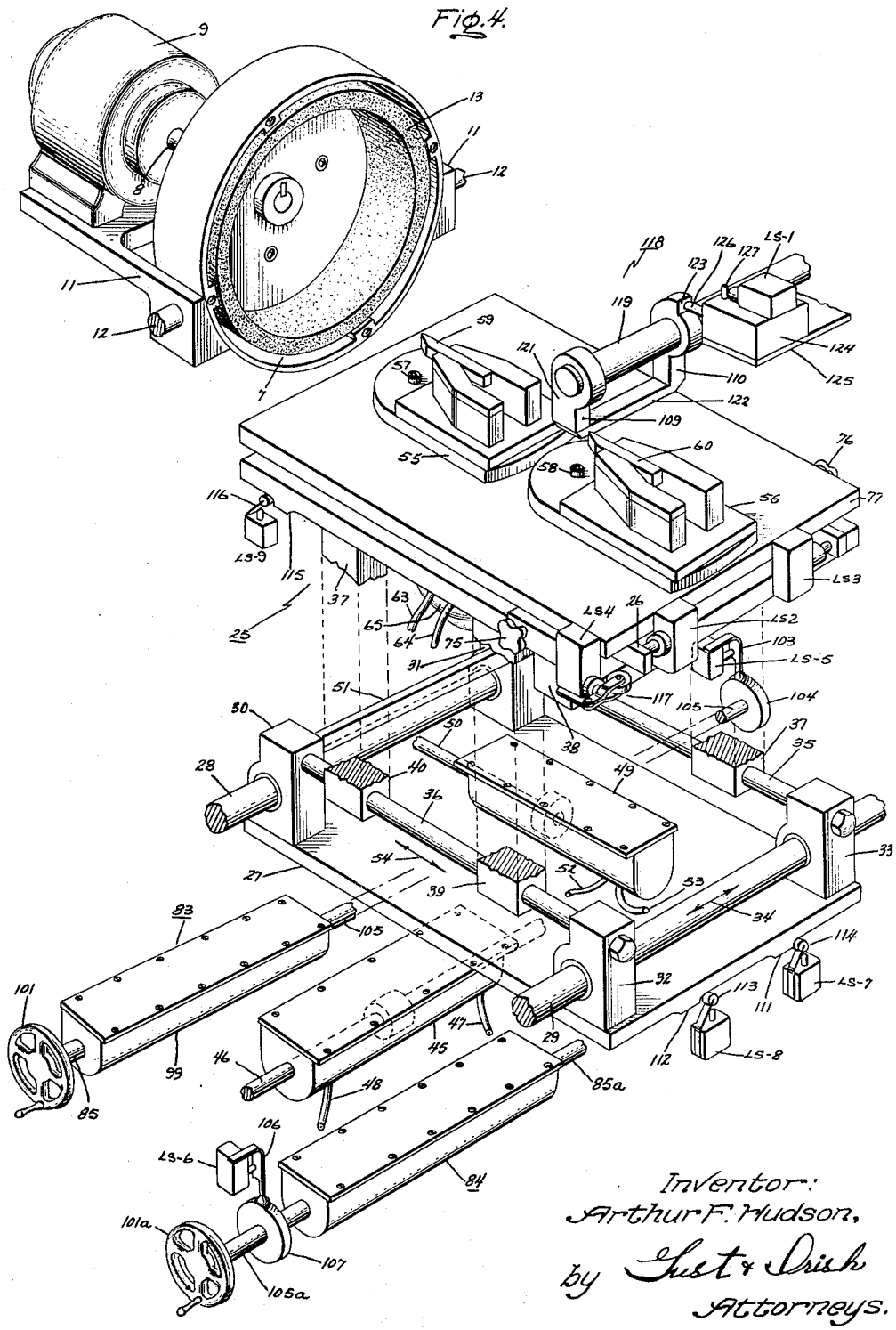
Fig. 4 is a fragmentary exploded view illustrating the table and fixture assembly of my invention.

Fig. 13 schematically illustrates the sequence of motions employed by my machine in the grinding of a tool having the configuration of Figs. 10 through 12, inclusive;

Fig. 14 is a top view showing another form of tool capable of being ground on my improved automatic contour tool grinding machine;

Fig. 15 is another view schematically illustrating the sequence of motions performed by my machine in grinding a tool having the configuration of Fig. 14;

Fig. 16 is a top view showing another form of tool which may be ground on my machine, the tool of this figure being the obverse of the tool of Fig. 14;

Fig. 17 is a top view showing yet another form of tool capable of being ground on my machine;

Fig. 18 is another top view showing a modified form of the tool of Fig. 17 which is also capable of being ground on my improved machine;

Fig. 19 is a fragmentary cross-sectional view illustrating the system for applying coolant to the working surface of the grinding wheel; and Fig. 20 is a view taken along the line 20—20 of Fig. 19 further illustrating the coolant applying system employed with my improved machine.

GENERAL DESCRIPTION OF MACHINE

The automatic single point tool grinding machine incorporating my invention and illustrated in the figures of the drawings provides three motions: traversing from side-to-side; longitudinal toward and away from the grinding wheel; and pivotal in which the tool being ground is swung from side-to-side to provide the desired radius. The requisite close tolerance tool form is obtained by employing a tool template, which may be a new tool having the correct form. The desired tool form is transferred to the worn tool being ground by having the tool to be ground secured in a forward tool holding fixture so as to contact the working face of the grinding wheel while the tool template is secured in a rearward tool holding fixture. The control system of the machine, which includes a selector switch for selecting the tool configuration to be ground and limit switches actuated responsive to the motions of the machine automatically programs the traversing and pivoting motions so that the tool is ground to the proper form. When the tool being ground approaches its final desired form, the template tool contacts a restraining bar which prevents the dull tool from moving into the grinding wheel beyond the desired finish form position. The motor driving the grinding wheel is of the two-speed type, being operated at its lower speed during the rough grinding of the tool and a high speed for finish grinding. Each time the template tool contacts the restraining bar, the limit switch is actuated. When the restraining bar is eventually held down for one entire cycle, a time delay relay actuated by the limit switch initiates operation of the motor at its higher speed so that the wheel acts as a hard lapping wheel. This high speed finishing operation is continued for a brief interval after which the fixture table with its tool holding fixtures moves away from the wheel to their initial tool loading position and the motor reverts to its low speed operation.

MECHANICAL CONSTRUCTION

Turning now to Figs. 1 through 7 of the drawing, my novel automatic single point tool grinding machine incorporating my invention, generally identified as 1, comprises a frame assembly 2 formed of side plates 3 and 4 and end plate 5. It will be seen that the side panel 3 is cut-out as at 6, the cut-out portion 6 in conjunction with the lower end panel 5 permitting access to the machine for loading and unloading the same.

The grinding wheel 7 is of the cup-shaped variety, being directly mounted on shaft 8 of two-speed, three phase motor 9. Motor 9 is mounted on support 10 which has extension portions 11 extending on either side of wheel 7 and being pivotally connected to side panels 3 and 4 by suitable bearings 12. It will be seen that the axis of the bearings 12 which pivotally support the motor 9 and the wheel 7 is horizontal, being generally in the plane of wheel 7 and disposed adjacent the lower extremity thereof. The pivotal connection of motor and wheel support 10 to the side panels 3 and 4 permits tilting of the working face 13 of wheel 7, the wheel being adjustably retained at the desired angle with respect to a vertical plane by means of members 14 and 15 pivotally connected respectively to motor support 10 and bottom panel 16 and to the threaded bushing 17. Bushing 17 cooperates with a screw member 18 pivotally connected at one end to panel 19 and having hand wheel 20 secured thereto at its other end. It will now be seen that rotation of hand wheel 20 and screw 18 will move the threaded bushing 17 inwardly or outwardly, as the case may be, thus pivoting motor support 10 downwardly or upwardly in turn tilting working face 13 of wheel 7 as desired.

The fixture supporting table assembly 25 is positioned between side panels 3 and 4 and between wheel 7 and rear panel 5 and comprises upper slide member 26 and lower slide member 27. A pair of ways 28 and 29 extend between side panels 3 and 4 in spaced apart parallel relationship, as shown, with the bottom slide member 27 being slidably supported thereon by means of bearing members 30, 31, 32 and 33. It is thus seen that the bottom slide member 27 may be moved transversely from side-to-side, as shown by arrow 34, on the transverse ways 28 and 29.

A pair of parallel spaced apart longitudinal ways 35 and 36 are secured respectively between sliding bearings 30 and 32, and 31 and 33, being disposed above the transverse ways 28 and 29 with the bottom slide member 27 being disposed below the transverse ways as shown. The upper slide member 26 is supported for longitudinal movement on the longitudinal ways 35 and 36 by means of suitable sliding bearing members 37, 38, 39 and 40. It is thus seen that the upper slide member 26 may be moved longitudinally toward and away from the wheel 7 by means of longitudinal ways 35 and 36.

The fixture table assembly 25 is moved transversely from side-to-side by means of a suitable hydraulic cylinder 45 secured to the bottom surface of the lower slide member 27 and having its push-rod 46 extending between the side panels 3 and 4 as shown. Suitable hydraulic lines 47 and 48 are connected to the hydraulic cylinder 45 in order to actuate the same for movement in either direction. Hydraulic lines 47 and 48 are connected to a suitable hydraulic system as shown in Fig. 8 and to be hereinafter more fully described.

The upper slide member 26 is moved longitudinally toward and away from wheel 7 by means of a suitable hydraulic cylinder 49 connected to the bottom surface of upper slide member 26 with its push-rod 50 being secured to transverse member 51 which connects transverse bearing members 32 and 33. Suitable hydraulic lines 52 and 53 are connected to hydraulic cylinder 49 in order to actuate the same for movement in either direction, hydraulic lines 52 and 53 being connected to the hydraulic system of the machine as shown in Fig. 8. It is now seen that the upper slide member 26 is moved longitudinally toward and away from wheel 7 in the direction shown by the arrow 54. A pair of tool holding fixtures 55 and 56 are provided having their front ends respectively pivotally mounted on the upper surface of the upper slide member 26, as at 57 and 58. It will be seen that the forward tool holding fixture member 55 is adapted to hold a tool 59 in working engagement with the working face 13 of wheel 7 while the rear tool holding fixture 56 is adapted to hold a template or form tool 60. Reference to Fig. 2 will further reveal that the upper slide member 26 when in its forward position with the tool 59 in engagement with working surface 13 of grinding wheel 7 extends underneath the wheel 7. It will further be seen that when in its tool grinding position, the pivot point 58 of the tool holding fixture 55 is in generally the same plane with the working surface 13 of wheel 7 so that pivotal motion of the fixture 55 will cause a radius to be ground at the end of the tool 59.

The tool holding fixtures 55 and 56 are simultaneously pivoted from side-to-side in equal arcs, i.e., clockwise and counterclockwise by means of a suitable hydraulic motor 65 mounted on the lower surface of the upper slide member 26 and extending into the space defined by the transverse ways 28 and 29 and the longitudinal ways 35 and 36. Referring particularly to Fig. 5, tool holders 55 and 56 are pivoted by means of shafts 66 and 67 respectively secured thereto and extending downwardly through the upper slide member 26. Hydraulic motor 65 thus drives the tool holding fixtures 55 and 56 for limited pivotal motion by means of a gear 68 secured to its shaft 69 which in turn drives gears 70 and 71 respectively secured to the shafts 66 and 67 through idler gears 72 and 73. Hydraulic motor 65 has suitable hydraulic lines 63 and 64 connected thereto for driving the same in either direction, hydraulic lines 63 and 64 being connected to the hydraulic system of the machine as shown in Fig. 8.

The gear 71 connected to shaft 67 of template tool holding fixture 56 and driven from gear 68 of hydraulic motor 65 through idler gear 73 also drives a rack 74 which it will be seen moves from side to side as the gear 71 is rotated in one direction or the other direction. Transverse movement of rack 74 is limited by means of radius stop screws 75 and 76 and it will thus be seen that the extreme clockwise position of the tool holding fixture members 55 and 56 is adjustably limited by means of radius stop screw 75 while the extreme counterclockwise rotation of the fixtures 55 and 56 is adjustably limited by radius stop screw 76.

A pair of limit switches LS2 and LS3 are provided respectively mounted on the rear edge 77 of the upper slide member 26, limit switches LS2 and LS3 being respectively actuated by means of actuating members 78 and 79 responsive to movement of the rack 74 to its extreme positions. Limit switch LS2 is actuated responsive to tool holding fixtures 55 and 56 being driven to their extreme clockwise positions whereas limit switch LS3 is actuated responsive to the fixtures 55 and 56 being driven to their extreme counterclockwise positions.

The extreme left and right transverse positions of the table assembly 25 are adjustably set by means of transverse stop assemblies 83 and 84 secured on the bottom surface of the lower slide member 27 on either side of hydraulic cylinder 45. Referring now particularly to Fig. 9 in addition to the other figures of the drawing currently under discussion, there is shown a cross-sectional view of the transverse stop screw assembly 83. Here, a shaft member 85 extends through openings 86 and 87 in side panels 3 and 4 being supported for rotational and axial movement by means of suitable bearings 88 and 89 respectively mounted on the side panels 3 and 4 as shown. Shaft 85 has a shoulder portion 90 and a threaded portion 91 on which a collar 92 having a dowel pin 183 projecting downwardly therefrom is threadingly mounted. A suitable bushing 93 is provided secured to side panel 3 and having an annular recess 94 formed therein surrounding portion 95 of shaft 85. A suitable coil spring 96 being seated in recess 94 surrounding shaft portion 95 and abutting the shoulder 90. A pair of sliding bearing members 97 and 98 are provided with shaft 85 extending therethrough, as shown, the bearing members 97 and 98 being interconnected by a sleeve member 99 having a slot 100 formed therein in which dowel pin 183 of collar 92 is disposed. It will now be seen that rotation of hand wheel 101 on the end of portion 95 of shaft 85 will cause the collar 92 to move to the left or to the right on threaded portion 91, as the case may be, collar 92 being restrained against rotation by means of the engagement of dowel 183 with the side walls of the slot 100 in sleeve member 99.

Assuming now that the lower slide member 27 is moved to the left toward side panel 3 under the influence of appropriate actuation of hydraulic cylinder 45, end 102 of slot 100 in sleeve 99 will, in due course, engage dowel pin 183 of collar 92 thus moving shaft 85 to the left against spring 96 and thus limiting the left-hand motion of lower slide 27 and thus of table assembly 25; it will be seen that rotation of hand wheel 101 and thus movement of collar 92 selectively determines the position of dowel pin 183 and thus the extreme left-hand position of lower slide member 27 in table assembly 25. Limit switch LS5 is mounted on side panel 4 and has an actuating arm 103 which engages actuating member 104 on portion 105 of the shaft 85. It is thus seen that when leftward movement of the lower slide 27 causes engagement of end 102 of slot 100 with dowel pin 183 of collar 92 thus in turn moving shaft 85 to the left against spring 96, actuating member 104 will cause a corresponding movement of lever 103 of limit switch LS5 thus actuating limit switch LS5 to indicate that the lower slide member 27 and table assembly 25 are in their extreme left-hand positions.

Transverse stop screw assembly 84 is constructed identically to assembly 83 being, however, arranged adjustably to limit the right hand movement of lower slide member 27 and table assembly 25. Here, limit switch LS6 is provided mounted on the side panel 3 with its lever 106 engaging actuating member 107 on shaft portion 105a of transverse stop screw assembly 84. Thus, as in the case of transverse stop screw assembly 83, rotation of hand wheel 101a adjustably determines the extreme right hand position of lower slide member 27 and table assembly 25, shaft 85a and its portion 105a being moved to the right when the lower slide member 27 reaches a predetermined right-hand position thus moving actuating member 107 and lever 106 thereby to actuate limit switch LS6 to indicate that the table assembly 25 has reached its extreme right-hand position.

As will be hereinafter more fully described, it is desired to sense intermediate transverse positions of the lower slide member 27 and table assembly 25, and thus cam portions 111 and 112 are formed on the bottom surface of lower slide 27, cam portions 111 and 112 respectively actuating limit switches LS7 and LS8 by means of lever members 113 and 114 respectively.

As will be more fully described hereinafter, it is further desirable to sense forward motion of the longitudinal moving upper slide 26 and thus a cam surface 115 is formed on the bottom surface of upper slide member 26 which is arranged to actuate limit switch LS9 through its lever member 116. As will be further more fully described, it is desired to sense when the upper slide member 26 is in its extreme rearward position and when it has moved forwardly away therefrom, and thus limit switch LS4 is mounted on upper slide member 26 with its lever member 117 arranged to engage rear panel 5 and thus to actuate limit switch LS4 when upper slide member 26 is in its extreme rearward position.

In order to initiate increase in the speed of the motor 9 thus to provide the polishing action and also finally to terminate grinding of tool 59 and to return the table assembly 25 to its initial position, restraining bar assembly 118 is provided. Restraining bar assembly 118 comprises a shaft member 119 pivotally mounted on mounting plate 120 which is secured to the side panel 4 in any suitable manner, as by bolts 121. Shaft 119 has a pair of lever members 109 and 110 secured thereto and extending downwardly therefrom with restraining bar 122 joining the ends of the same, as shown. Lever member 110 has an actuating portion 123 formed above shaft 119 at its end remote from the restraining bar 122. Limit switch LS1 is mounted on adjusting assembly 124 which in turn is mounted on a supporting plate 125 secured to the mounting plate 120. Adjusting assembly 124 includes an actuating pin 126 arranged to be engaged by the actuating portion 123 of the lever member 110. Actuating pin 126 is arranged to be adjustably moved inwardly or outwardly in its normal position away from actuating portion 123 of lever member 110 and includes a portion 127 arranged to actuate limit switch LS1. It will now be seen that advance of upper slide 26 of table assembly 25 eventually causes the template tool 60 to engage the restraining bar 122 thus to rotate the lever members 109 and 110 on the pivoted shaft 119. This in turn causes the actuating portion 123 of the lever member 110 to engage and depress the adjustable actuating pin 126 in turn causing portion 127 to actuate limit switch LS1.

Referring now particularly to Fig. 6, it may be desirable to provide a guard around the wheel 7 and thus, there is shown a guard member 128 surrounding the face and peripheral edge of the wheel 7 and having a window 129 formed therein communicating with the working face 13 of the wheel and through which tool 59 extends. Guard 128 is rotatably mounted on frame 130 by spaced bearing members 131, the frame 130 being secured to the side panels 3 and 4. Guard member 128 is caused to rotate responsive to transverse motion of the table assembly 25 thus causing the window 129 to move from side to side to accommodate corresponding transverse motion of tool 59 which extends therethrough by means of a member 132 having a slot 133 formed therein engaged by a pin 134 secured to the forward edge of the lower slide member 27. It is thus seen that as the lower slide member 27 moves from side to side under the influence of its hydraulic cylinder 45, pin 134 in slot 133 of member 132 will likewise move from side to side thereby to rotate the guard 128 and the window 129 therein.

THE HYDRAULIC SYSTEM

Referring now particularly to Figs. 8 and 9, the hydraulic system of the machine of the previous figures includes a suitable pump 141 driven by a suitable electric motor 142, shown here as being a three phase alternating current motor, the pump 141 being connected by line 143 to a reservoir 144 of hydraulic fluid. The forward feed cylinder 49 has its two hydraulic lines 52 and 53 respectively connected to four-way valve 145 having solenoid SL5 which, when energized, actuates valve 145 to cause push-rod 50 of hydraulic cylinder 49 to move outwardly thus to move the upper slide member 26 forwardly toward the wheel 7. It will be readily understood that four-way hydraulic valves are commercially available and well known in the art and thus need not be more fully described. Valve 145 is of the type which when solenoid SL5 is deenergized, reverses its hydraulic connection so as to actuate cylinder 49 to move push-rod 50 in the opposite direction, i.e., inwardly thereby moving upper slide 26 away from the wheel 7. Hydraulic fluid discharge line 146 of four-way hydraulic valve 145 has a restraining valve 147 connected therein actuated by coil 21CR. Thus, when coil 21CR is energized, a restriction is inserted in the hydraulic fluid discharge line 146. As will be hereafter more fully described, when the upper slide 26 begins to move forwardly toward wheel 7, limit switch LS9 is momentarily actuated thereby energizing time delay relay 3TR in turn causing energization of the coil 21CR to place a restraint on the hydraulic fluid discharge from valve 145 thus cushioning the forward movement of the upper slide member 26 until the tool 59 has come into grinding engagement with the working face 13 of the wheel 7. Time delay relay 3TR has a predetermined time delay on chop out so that coil 21CR is not deenergized to remove the restraint in the discharge line 146 and thus to eliminate the cushioning action until after grinding of the tool has been initiated. It will be seen that the four-way hydraulic valve 145 is connected to be supplied with hydraulic fluid from the pump 141 by means of hydraulic line 148.

The cross-feed hydraulic cylinder 45 has its hydraulic lines 47 and 48 connected to four-way hydraulic valve 149, valve 149 being of the type having two actuating solenoids SL1 and SL2. Thus, energization of solenoid SL1 actuates valve 149 to connect hydraulic line 47 to the hydraulic line 148 from pump 141 thereby to move pushrod 46 of hydraulic cylinder 45 to the right thus moving the table assembly 25 to the right with the other hydraulic line 48 being connected to the discharge line 150. Conversely, energization of the solenoid SL2 of the valve 149 causes the valve 149 to connect the other hydraulic line 48 to the hydraulic fluid supply line 148 with the hydraulic line 47 being connected to the discharge line 150 thereby causing push rod 46 of hydraulic cylinder 45 to move to the left so that the table assembly 25 is moved to the left.

The hydraulic fluid supply lines 63 and 64 of the hydraulic motor 65 are respectively connected to another conventional four-way hydraulic valve 152 having actuating solenoids SL3 and SL4. Here, therefore, energization of solenoid SL3 of four-way valve 152 connects hydraulic line 64 of hydraulic motor 65 to the hydraulic fluid supply line 148 and the other hydraulic line 63 to the discharge line 153 thus causing hydraulic motor 65 to rotate clockwise thereby rotating fixtures 55 and 56 in the clockwise direction. Contrarywise, energization of the solenoid SL4 of valve 152 connects line 63 of hydraulic motor 65 to the hydraulic fluid supply line 148 with the other line 64 being connected to discharge line 153 thereby causing hydraulic motor 65 to rotate in the counterclockwise direction again rotating the fixtures 55 and 56 in the counterclockwise direction. Since hydraulic systems of this type are well known in the art, conventional pressure relief devices and the details of construction of the four-way valves 145, 149 and 152 have not been shown since they are not necessary to an understanding of my invention.

ELECTRICAL CONTROL SYSTEM AND OPERATION

Referring now additionally to Figs. 7a, 7b and 10 through 18, the sequence of operations in the grinding of several different types of single point tools and the control to effect this sequencing will be described. Referring now particularly to Figs. 7a, 7b, 10, 11 and 13, there is shown a typical single pointed tool 155 having a radial clearance angle 156 as shown in Fig. 11. It will here be understood that to grind a tool of the type shown in Figs. 10 and 11, hand wheel 20 is adjusted so as to tilt grinding wheel 7 so that its working face 13 defines the requisite angle with the face of the tool in the forward tool holding fixture 55 (Fig. 2). In Fig. 13, the sequencing of table and fixture motions in grinding a tool of the type shown in Figs. 10 and 11 is shown, the sequencing beginning at the bottom of the figure and the several distinct positions indicated by the Roman numerals I through VI.

Referring now to position I of Fig. 13, table 25 is initially in its extreme rearwardly and left-hand position with the fixtures 55 and 56 rotated counterclockwise as shown, the tool to be ground and the template tool having been loaded in this position. Actuation of the start switch 157 (Fig. 7a) causes the fixtures 55 and 56 to rotate clockwise to the right, as shown and the table assembly 25 to start its soft forward motion, as indicated by the arrow 158. As shown in position II of Fig. 13, as soon as the fixtures 55 and 56 reach their clockwise position, table assembly 25 also starts its transverse motion toward the right, as shown by the arrow 159. As shown in position III of Fig. 13, when the table 25 reaches its extreme right hand position, fixtures 55 and 56 then rotate counterclockwise to the left, as shown, forward motion continuing as shown by the arrow 158. As shown in position IV of Fig. 13, as soon as the fixtures 55 and 56 complete their counterclockwise rotation, transverse movement of table 25 to the left, as shown by the arrow 160 is initiated, the forward movement of the table as shown by the arrow 158 continuing. Position V of Fig. 13 is identical to position I, however showing the tool 155 as having had its face 161 come into engagement with the working face 13 of wheel 7. Here, fixtures 55 and 56 again rotate clockwise as shown to grind the radius 162, the forward motion 158 continuing; right hand motion 158 then takes place to grind face 170 of tool 155. As soon as the table 25 begins its forward motion 158 in position I, limit switch LS9 is actuated thus causing energization of coil 21CR of the restricting valve 147 in discharge line 146 of four-way valve 145 in order to prevent the tool 155 from striking the working face 13 of wheel 7 with excessive force thus causing damage to either the tool or the wheel. As will be hereinafter described, while limit switch LS9 is only momentarily actuated, during its actuation it picks up time delay relay 3TR which has a predetermined time delay on drop-out thus maintaining coil 21CR energized until tool 155 has come into engagement with grinding wheel 7.

It will now be seen, by reference to Fig. 13, that to grind a tool of the configuration of that shown in Figs. 10 and 11, three motions are provided, a steady soft forward motion, as shown by the arrow 158, a positive side-to-side transverse motion, as shown by the arrows 159 and 160, and pivotal motion of the fixtures 55 and 56, the fixtures pivoting from their counterclockwise to their clockwise positions each time the table is in its extreme left-hand position and conversely, from their clockwise to their counterclockwise position each time the table is in its extreme right hand position. It is thus seen that with my improved machine, the tool being ground is stroked back and forth across the working face of the grinding wheel, the transverse hydraulic driving of the table 25 being so rapid that the tool being ground dissipates heat all of the way; by contrast, the speed with which an operator manually can traverse a tool across a wheel face is limited at best. Furthermore, in the case of the tool configuration of Figs. 10 and 11, at the end of each traversing movement, the fixtures rotate grinding the radius 162 at the end of the tool, this radius grinding action being also accomplished very rapidly. Thus, by dissipating the heat of grinding across several inches of the face of the grinding wheel and around both angles and the radius of the tool, the temperature of the carbide is maintained relatively low and the time cycle for sharpening a typical carbide tool is generally under one minute.

When the table 25 has advanced so that the template tool 60 contacts and depresses the restraining bar 122, as shown in position VI of Fig. 13, a first time delay is initiated by time delay relay 1TR at the end of which the speed of the motor 9 and wheel 7 is increased to the polishing level, a second time delay now being initiated at this instant by time delay relay 2TR. During the two successive time delay intervals, the table 25 continues to traverse from side-to-side with the accompanying pivoting of the fixtures 55 and 56 at the end of each traversing stroke, the duration of the first time delay being preferably on the order of one complete side-to-side traversing cycle and the duration of the second time delay interval, i.e., the high speed polishing cycle being preferably on the order of two side-to-side traversing cycles. At the end of the second time delay interval, the table 25 is returned to its original position I with the fixtures 55 and 56 being in their counterclockwise positions as shown, the speed of the motor 9 and wheel 7 being simultaneously reduced to the lower level.

It will be seen that the tool 163 of Fig. 12 is similar in configuration to that of Figs. 10 and 11, with, however, the two sides 164 and 165 forming different angles with the axis of the tool and thus being of different lengths. This in turn requires that the extreme clockwise position of the fixtures 55 and 56 in which the side 164 of tool 163 is ground define a smaller angle with the longitudinal axis of the table 25 than does the extreme counter-clockwise position in which the side 165 is ground. This may be readily accomplished by suitable adjustment of the radius stop screws 75 and 76 which determine the extreme clockwise and counterclockwise positions of the fixtures 55 and 56.

Referring now to Fig. 14, a tool 166 is shown having a different configuration from the tools of Figs. 10, 11 and 12. Here, tool 166 has one side 167, a radius 168, and another side 169, parallel with the major axis of the tool. A tool having the configuration of Fig. 14 is ground with my improved machine with the programming as shown in Fig. 15. Here, in position I, table 25 is at its left extreme position with the fixtures 55 and 56 in their extreme clockwise positions. Depression of the start button 157 (Fig. 7a) initiates counterclockwise rotation of the fixtures 55 and 56 and after they have reached their counterclockwise positions, as shown in position II, the longitudinal forward and transverse rightward motions 158 and 159 are initiated. When the table 25 reaches its extreme right hand position, as shown in position III, the fixtures 55 and 56 remain in their counterclockwise positions and the table immediately begins its left hand traversing motion 160. When the table 25 again reaches its extreme left hand position, as shown in position IV, the fixtures 55 and 56 then rotate to their extreme clockwise positions, and right hand traversing motion 159 is again initiated as shown in position V. Here, however, when the table 25 reaches an intermediate position, as sensed by the limit switch LS7 engaging cam surface 112, the right hand traversing motion 159 is terminated and left hand traversing motion 160 is again initiated. When the table 25 returns to its extreme left hand position, as shown in position VII, the fixtures 55 and 56 again return to their counterclockwise position and the motions of positions II through VII are repeated.

When the forward motion 158 brings tool 166 into engagement with grinding wheel 7 (position VI), thereafter side 167 is ground with tool holders 55 and 56 in their counterclockwise positions (as shown in positions II, III and IV of Fig. 15) and with the full side-to-side traversing motion, radius 168 is ground during the two rotations of the tool holders, at the beginning and end of the short side-to-side traversing motion, and the side 169 is ground during the short side-to-side traversing motion with tool holders 55 and 56 in their extreme clockwise positions (as shown in positions I, V, VI and VII of Fig. 15); it is seen that the tool 166 must be disposed parallel to the face of wheel 7 in order to grind side 169 and thus the short side-to-side traversing motion with the tool holders in their extreme clockwise positions is provided in order to grind side 169.

As in the case of the programming of Fig. 13, when the template tool 60 engages the restraining bar 122, the two time delay periods are initiated, the traversing and fixture rotating motions continuing, the motor and grinding wheel speed being increased during the second time delay period to effect the polishing action with the table thereafter being returned to its initial position I. It will here be seen that the motion cycle of Fig. 15 contemplates the complete side-to-side traversing motion of the table 25 with the fixtures in their counterclockwise position, rotation of the fixtures to their clockwise position followed by a short side-to-side traversing motion, and then rotation of the fixtures back to their counterclockwise position followed by another complete full-length side-to-side traversing motion.

Referring briefly to Fig. 16, it will be seen that the tool 170 shown therein is the obverse of the tool 166 of Fig. 14. The motion sequence of the table 25 and fixtures 55 and 56 to grind the tool 170 are thus exactly the reverse of those shown in Fig. 15, i.e., the table 25 has its initial position to the right with the fixtures 55 and 56 in their counterclockwise positions being first rotated to their clockwise positions. A full length side-to-side traversing motion then follows with the fixtures then rotating to their counterclockwise positions followed by a short traversing motion from the extreme right hand position to an intermediate position, this traversing motion being initiated by actuation of limit switch LS8 by cam surface 111.

Referring now to Figs. 17 and 18, there are shown tools 175 and 176 respectively having flat cutting edges 177 and 178 the tool 176 additionally having relief portions 179 and 180. Thus, in order to grind the tools 175 and 176 of Figs. 17 and 18, it is not necessary that the fixtures 55 and 56 rotate in order to grind a radius and thus, fixtures 55 and 56 are disposed along the longitudinal axis of the table 25 with the table motion being merely transversely side-to-side (159–160) and longitudinal (158) as in the case of the other tool configurations, the fixtures 55 and 56 remaining stationary throughout the grinding cycle.

Figure 7A:
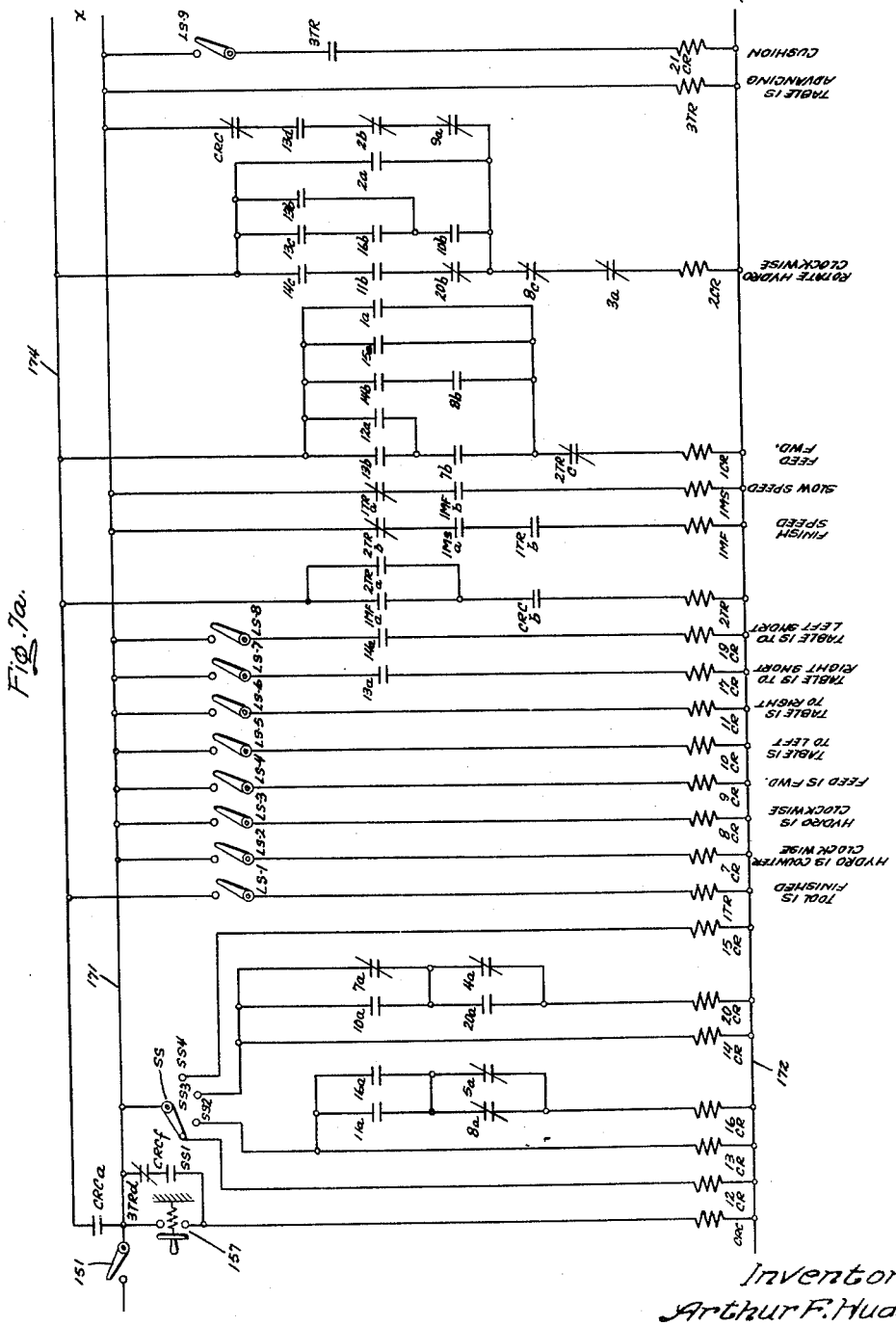

Referring now particularly to Figs. 7a and 7b, Chart I, set out below enumerates the contacts which are closed and the coil circuits which are energized in each of the positions I through VI of Fig. 13 while grinding a tool having the configuration of Figs. 10 through 12. Here, switch SS (Fig. 7a) is a four-position selector switch, position SS1 calling for grinding of a tool having the configuration of Figs. 10 through 12, SS2 calling for a tool having the general configuration of Fig. 14 (or having a side 169 having an angle of less than 20° from the center line of the tool shank), SS3 calling for a tool having the configuration of Fig. 16 (or again having a side 169a having an angle of less than 20° from the center line of the tool shank), and SS4 calling for grinding of a tool having the configuration of Figs. 17 and 18.

For grinding a tool having the configuration of Figs. 10 and 11, switch SS is in position SS1. Assuming now that table 25 is in its extreme left and rearward positions, as shown in position I in Fig. 13, when line switch 151 is closed, energizing lines 171 and 172 with control power, i.e., for example 115 volts, 60 cycle single phase, alternating current, it will be seen that coil 12CR is energized through switch position SS1, limit switch LS2 is closed responsive to the counterclockwise position of fixtures 55 and 56 and thus coil 7CR is energized, and limit switch LS5 is closed responsive to table 25 being in its left position energizing coil 10CR. Relays 1TR and 1MF are not energized and thus coil 1MS is energized through normally closed contacts 1TRa and 1MFb. Energization of coil 1MS closes its contacts 1MSb to energize the three phase alternating current motor 9 for its lower speed operation, for example 865 r.p.m., from a suitable source 173 of three phase alternating current, for example 440 volts, 60 cycles.

In the event that the table 25 is not in its extreme left hand position when line switch 151 is closed, limit switch LS5 will not be closed. Under these circumstances, coil 5CR is energized through contacts 12f (coil 12CR being energized through switch position SS1), 7e (coil 7CR being energized through limit switch LS2) and normally closed contacts 20f, 10e and 4c, the corresponding coils 20CR, 10CR and 4CR not being energized. Energizing coil 5CR closes its contacts 5e to energize solenoid 2SL thereby to move table 25 to the left until limit switch LS5 closes. Closing the limit switch LS5 energizes coil 10CR opening normally closed contact 10e thereby to deenergize coil 5CR in turn opening its contact 5e to deenergize solenoid 2SL. In the event that the hydraulic motor 65 and the fixtures 55 and 56 are not in their extreme counterclockwise position, limit switch LS2 will be open and coil 7CR will not be energized. Under these conditions, coil 3CR is energized through normally closed contact CRCd of as yet unenergized control relay CRC, contact 12d of coil 12CR energized through switch position SS1 and normally closed contacts 9b, 7c and 2b of the corresponding unenergized coils 9CR, 7CR and 2CR. Energization of coil 3CR closes its contacts 3c thereby to energize solenoid 4SL to cause rotation of the hydraulic motor 65 and fixtures 55 and 56 in the counterclockwise direction until limit switch LS2 closes. Closing of limit switch LS2 energizes coil 7CR thereby opening contact 7c to deenergize coil 3CR in turn deenergizing solenoid 4SL to terminate the counterclockwise rotation of the hydraulic motor and the fixtures.

With table 25 in position I of Fig. 13, momentarily depressing start button 157 energizes control relay coil CRC closing its contact CRCf thus sealing in coil CRC through normally closed contacts 2TRd of the as yet unenergized time delay relay 2TR and sealing contact CRCf. Coils 12CR, 7CR and 10CR are still energized through switch position SS1 and limit switches LS2 and LS5 respectively and the slow speed motor relay coil 1MS is energized through normally closed contacts 1TRa and 1MFa. Picking up of control relay CRC closes its contact CRCa to energize line 174, and thus coil 1CR will be energized through contacts 12a (closed since coil 12CR is energized through switch position SS1) 7b (closed since coil 7CR is energized through limit switch LS2) and normally closed contact 2TRc of the as yet unenergized time delay relay 2TR. Energization of coil 1CR closes its contact 1b to energize solenoid 5SL to initiate forward motion 158 of table 25. Furthermore, picking up of the feed forward relay coil 1CR closes its contact 1a across contacts 12a and 7b thus sealing in the feed forward relay 1CR; the feed forward relay 1CR remains picked up and the forward motion 158 of table 25 continues until time delay relay 2TR is energized thus opening its contact 2TRc.

Chart I

TOOL STYLE NO. 1—SELECTOR SWITCH POSITION NO. 1

Ia (Before "start")

| | | | | | | | | |
|---|---|---|---|---|---|---|---|---|
| Switch or Contact Closed | SS1 | LS2 | LS5 | | 1TRa<br>1MFb | 12f<br>7e<br>20f<br>10e<br>4c } Note 1 | | CRCd<br>12d<br>9b<br>7b<br>2b } Note 2 |
| Coils Energized | 12CR | 7CR | 10CR | | 1MS<br>(slow speed) | 5CR<br>(table to left) | | 3CR<br>(rotate hydro counterclockwise) |

NOTE 1.—With table not to left (LS5 not closed).
NOTE 2.—With hydro not counterclockwise (LS2 not closed).

Ib (After "start")

| | | | | | | | CRCa | |
|---|---|---|---|---|---|---|---|---|
| Switch or Contact Closed | SS1 | 2TRd<br>CRCf | LS2 | LS5 | | 1TRa<br>1MFa | 12a<br>7b } 2a<br>2TRc | 12b<br>10b } 2a<br>8c<br>3a |
| Coils Energized | 12CR | CRC | 7CR | 10CR | | 1MS<br>(slow speed) | 1CR<br>(feed forward) | 2CR<br>(rotate hydro clockwise) |

II

| | | | | | | | | CRCa | | |
|---|---|---|---|---|---|---|---|---|---|---|
| Switch or Contact Closed | SS1 | 2TRd<br>CRCf | LS3 | LS5 | LS4 | LS9 | 1TRa<br>1MFa | 1a | 12e<br>8d } 4b<br>11d<br>16d<br>5c | 3TRa |
| Coils Energized | 12CR | CRC | 8CR | 10CR | 9CR | 3TR | 1MS<br>(slow speed) | 1CR<br>(feed forward) | 4CR<br>(tableto right) | 21CR<br>(cushion) |

III

| | | | | | | | | CRCa | | |
|---|---|---|---|---|---|---|---|---|---|---|
| Switch or Contact Closed | SS1 | 2TRd<br>CRCf | LS3 | LS6 | LS4 | LS9 | 1TRa<br>1MFa | 1a | 12c<br>11c } 3b<br>7c<br>2b | 3TRa |
| Coils Energized | 12CR | CRC | 8CR | 11CR | 9CR | 3TR | 1MS<br>(slow speed) | 1CR<br>(feed forward) | 3CR<br>(rotate hydro counterclockwise) | 21CR<br>(cushion) |

IV

| | | | | | | | | CRCa | | |
|---|---|---|---|---|---|---|---|---|---|---|
| Switches or Contact Closed | SS1 | 2TRd<br>CRCf | LS2 | LS6 | LS4 | LS9 | 1TRa | 1a | 12f<br>7e } 5d<br>20f<br>10e<br>4c | 3TRa |
| Coils Energized | 12CR | CRC | 7CR | 11CR | 9CR | 3TR | 1MS<br>(slow speed) | 1CR<br>(feed forward) | 5CR<br>(table to left) | 21CR<br>(cushion) |

V

| | | | | | | | | CRCa | |
|---|---|---|---|---|---|---|---|---|---|
| Switch or Contact Closed | SS1 | 2TRd<br>CRCf | LS2 | LS5 | LS4 | | 1TRa<br>1MFa | 1a | 12b<br>10b } 2a<br>8c<br>3a | |
| Coils Energized | 12CR | CRC | 7CR | 10CR | 9CR | | 1MS<br>(slow speed) | 1CR<br>(feed forward) | 2CR<br>(rotate hydro clockwise) | |

Positions II–V repeated until template depresses bar closing LS1.

VIa

| | | | | | | | |
|---|---|---|---|---|---|---|---|
| Switch or Contact Closed | SS1 | 2TRd<br>CRCf | LS2 or LS3 | LS5 or LS6 | LS4 | LS1 | Same as previous positions—1TR begins timed pick-up. |
| Coils Energized | 12CR | CRC | 7CR or 8CR | 10CR or 11CR | 9CR | 1TR | Positions II–V repeated during pick-up of 1TR. |

VIb

| | | | | | | | | | |
|---|---|---|---|---|---|---|---|---|---|
| Switches Closed | SS1 | 2TRd<br>CRCf | LS2 or LS3 | LS5 or LS6 | LS4 | LS1 | {2TRb<br>1MSa<br>1TRb} | 1MFa<br>CRCb | Others same as previous positions. 2TR begins timed pick-up. Positions II–V repeated during pick-up of 2TR. |
| Coils Energized | 12CR | CRC | 7CR or 8CR | 10CR or 11CR | 9CR | 1TR | 1MF<br>(fast speed) | 2TR | |

VIc

2TR times out and picks up.
2TRc opens, 1CR drops out—table returns to rear.
2TRd opens, CRC drops out—position Ia resumed.

In addition, coil 2CR is energized through contacts 12b (closed since coil 12CR is energized through switch position SS1), and 10b (closed since coil 10CR is energized through limit switch LS5) and normally closed contacts 8c and 3a of corresponding coils 8CR and 3CR which are as yet unenergized. Energization of coil 2CR closes its contact 2c to energize solenoid 3SL and thus to rotate the hydraulic motor 65 and fixtures 55 and 56 in a clockwise direction. Picking up of the clockwise hydraulic motor relay 2CR closes its contact 2a thus sealing in coil 2CR through contacts 8c and 3a. It will now be seen that when the hydraulic motor 65 rotates fixtures 55 and 56 to their extreme clockwise position, limit switch LS3 will close to energize coil 8CR thus opening contact 8c to deenergize coil 2CR in turn opening its contact 2c and deenergizing solenoid 3SL to terminate clockwise rotation of the hydraulic motor 65 and fixtures 55 and 56.

Closing of limit switch LS3 and energization of coil 8CR responsive to the hydraulic motor 65 and fixtures 55 and 56 reaching their extreme clockwise position closes contact 8d thus energizing coil 4CR through additional contacts 12e (closed by virtue of energization of coil 12CR through switch position SS1) and normally closed contacts 11d, 16d and 5c, the corresponding coils 11CR, 16CR and 5CR being deenergized, energization of coil 4CR closing its contact 4d thereby energizing solenoid 1SL to provide right hand traverse motion 159 for table 25. Energization of coil 4CR closes its contact 4b thus by-passing contacts 12e and 8d. It will be seen that when table 25 reaches its extreme right hand position, limit switch LS6 will close thus energizing coil 11CR in turn opening contact 11d to deenergize coil 4CR in turn opening its contact 4d to deenergize solenoid 1SL thus to terminate right hand traversing motion 159 of table 25. In addition, as table 25 begins its forward motion 158, limit switch LS9 is momentarily closed thus momentarily energizing the coil of time delay relay 3TR. Contact 3TRa is thus closed energizing coil 21CR which in turn applies the restraint in the discharge line 146 of the feed forward hydraulic cylinder 49 as previously described. Time delay relay 3TR is provided with a predetermined time delay on drop out and thus contact 3TRa will open for a predetermined amount of time sufficient to permit the tool to engage the working surface 13 of grinding wheel 7. After expiration of the predetermined time delay, the delay relay 3TR drops out thus opening its contact 3TRa thereby deenergizing coil 21CR to dump the cushion provided thereby on the forward motion 158.

Closing of limit switch LS6 and energization of coil 11CR responsive to table 25 reaching its extreme right-hand position closes contact 11c thus energizing coil 3CR through additional contacts 12c, 7c and 2b, energization of coil 3CR closing its contact 3c thereby to energize solenoid 4SL to rotate the hydraulic motor 65 and fixtures 55 and 56 counterclockwise. Energization of coil 3CR further closes its contact 3b by-passing contacts 12c and 11c. When the hydraulic motor 65 and fixtures 55 and 56 complete their counterclockwise rotation, limit switch LS2 closes energizing coil 7CR. This in turn closes contacts 7c to energize coil 5CR through additional contacts 12f, 20f, 10e and 4c. Energization of coil 5CR closes its contact 5e to energize solenoid 2SL and thereby to initiate the leftward transverse motion 160 of the table 25.

When table 25 again reaches its extreme left hand position, limit switch LS5 closes energizing coil 10CR closing its contact 10b and again energizing coil 2CR through contacts 12b, 8c and 3a. Energization of coil 2CR again closes its contact 2c to energize solenoid 3SL to provide clockwise rotation of hydraulic motor 65 and fixtures 55 and 56.

The above described action now continues until the tool 155 engages and depresses restraining bar 122 thereby closing limit switch LS1 to energize the time delay relay coil 1TR. As indicated in position VIa of Chart I, the tool does not engage restraining bar 122 thereby closing limit switch LS1 in any predetermined position of table 25 or fixtures 55 and 56, the table traversing and fixture rotating action continuing for an additional period as will now be described. Energization of time delay relay coil 1TR initiates a timed pick up and after such predetermined time delay, ordinarily equivalent to one complete side-to-side traversing motion of table 25, contact 1TR opens thus deenergizing the slow speed motor relay coil 1MS and contact 1TRb simultaneously closes. Deenergization of slow speed motor relay coil 1MS opens its contacts 1MSb thus deenergizing the slow speed windings of motor 9. In addition, deenergization of slow speed motor relay 1MS causes closing of its normally closed contacts 1MSa thus energizing high speed motor relay coil 1MF through contacts 2TRb, 1MSa and 1TRb. Energization of high speed motor relay coil 1MF closes its contacts 1MFc thus energizing the high speed motor windings of motor 9 to provide operation at high speed, such as 1730 r.p.m.

Energization of the high speed motor relay coil 1MF has also closed its contact 1MFa so that time delay relay 2TR is energized through control relay contact CRCb. Time delay relay 2TR likewise has a predetermined time delay on pick-up, preferably approximately equivalent to two complete side-to-side traversing motions of table 25. At the expiration of this time delay, contact 2TRb opens thus deenergizing the high speed motor relay coil 1MF in turn opening its contacts 1MFc thus deenergizing the high speed windings of motor 9. Contact 2TRc likewise opens deenergizing the feed forward relay coil 1CR in turn opening its contact 1b and deenergizing the feed forward solenoid 5SL thereby to reverse the longitudinal motion of table 25. Contact 2TRd also opens deenergizing control relay coils CRC. Deenergization of the high speed motor relay coil 1MF also closes its contact 1MFb again energizing the low speed motor relay coil 1MS in turn closing its contacts 1MSb thus reenergizing the low speed windings of motor 9. The conditions prevailing in position I described above are thus restored and the table 25 will return to its rearward left hand position with the fixtures 55 and 56 rotating to their counterclockwise positions. The operation of the electrical control of Figs. 7a and 7b for a tool having the configuration of Fig. 14 is set forth in Chart II below.

With the aid of Chart II and the control diagram of Figs. 7a and 7b, the action of the control circuit in programming grinding of a tool of the configuration of Fig. 16 can be readily ascertained and the programming of the grinding cycle for tools having the configuration of Figs. 17 and 18 can be equally readily ascertained from inspection of Figs. 7a and 7b.

It will now be seen that the programming of the motions of the table and the pivoting of the fixtures 55 and 56 for each of the four tool configurations capable of being ground in the illustrated embodiment is accomplished by means of the limit switches LS1 through LS9 and the selector switch SS, the selector switch SS in its several positions SS1 through SS4 setting up different combinations of contacts associated with the relays the coils of which are energized by the several limit switches to provide the desired programming.

It will be readily understood that the control diagrams of Figs. 7a and 7b have been simplified to the extent of eliminating such features such as manual control of the several motions, pilot lights, etc., such features being well known to those skilled in the art.

It will be readily seen that in order to grind a particular tool, it is merely necessary to secure a master template or tool in the template tool fixture 56, move the fixtures radially (by means of a manual control which, as indicated has not been shown in the circuit diagram 7a—7b in the interest of simplicity) until one side is parallel with and against the restraining bar 122, set the appropriate radius stop 75 or 76, swing the fixtures

Chart II

TOOL STYLE NO. 2—SELECTOR SWITCH POSITION NO. 2

Ia (Before "start")

| Switch or Contact Closed | SS2 | LS3 | LS5 | | 1TRa 1MFa | CRCc 13d 5b 9a 8c 3a } Note 1 | CRCe 13h 8f 10e 4c } Note 2 |
|---|---|---|---|---|---|---|---|
| Coils Energized | 13CR | 8CR | 10CR | | 1MS (slow speed) | 2CR (rotate hydro clockwise) | 5CR (table to left) |

NOTE 1.—With hydro not clockwise (LS3 not closed).
NOTE 2.—With table not to left (LS5 not closed).

Ib (After "start")

| Switch or Contact Closed | SS2 | 2TRd CRCf | LS3 | | LS5 | 1TRa 1MFb | CRCa 13e 10c 16c 7c 2b } 3b |
|---|---|---|---|---|---|---|---|
| Coils Energized | 13CR | CRC | 8CR | | 10CR | 1MS (slow speed) | 3CR (rotate hydro counterclockwise) |

II

| Switch or Contact Closed | SS2 | 2TRd CRCf | LS2 | LS4 | LS5 | 1TRa 1MFb | CRCa 13b 7b 2TRc } 1a 13f 16e 7d 11d 16d 5c } 4b | 3TRa |
|---|---|---|---|---|---|---|---|---|
| Coils Energized | 13CR | CRC | 7CR | 9CR | 10CR | 1MS (slow speed) | 1CR (feed forward) 4CR (table to right) | 21CR (cushion) |

III

| Switch or Contact Closed | SS2 | 2TRd CRCf | LS2 | LS4 | LS6 | | CRCa 1a 2TRc 13g 11e 20f 10e 4c } 5d SS2 11a 8a (16a) | 3TRa |
|---|---|---|---|---|---|---|---|---|
| Coils Energized | 13CR | CRC | 7CR | 9CR | 11CR | | 1CR (feed forward) 5CR (table to left) 16CR | 21CR (cushion) |

IV

| Switch or Contact Closed | SS2 | 2TRd CRCf | LS2 | LS4 | LS5 | 1TRa 1MFa | CRCa 1a 2TRc 13c 16b 10b 8c 3a } 2a SS2 16a | 3TRa |
|---|---|---|---|---|---|---|---|---|
| Coils Energized | 13CR | CRC | 7CR | 9CR | 10CR | 1MS (slow speed) | 1CR (feed forward) 2CR (rotate hydro clockwise) 16CR | 21CR (cushion) |

V

| Switch or Contact Closed | SS2 | 2TRd CRCf | LS3 | LS4 | LS5 | 1TRa 1MFa | CRCa 1a 2TRc 13f 16f 8d 11d 17a 5c } 4b SS2 16a 5a | 3TRa |
|---|---|---|---|---|---|---|---|---|
| Coils Energized | 13CR | CRC | 8CR | 9CR | 10CR | 1MS (slow speed) | 1CR (feed forward) 4CR (table to right) 16CR | 21CR (cushion) |

VI

| Switch or Contact Closed | SS2 | 2TRd CRCf | LS3 | LS4 | LS7 13a | 1TRa 1MFa | CRCa 1a 2TRc 13g 16g 17b 20f 10e 4c } 5d | |
|---|---|---|---|---|---|---|---|---|
| Coils Energized | 13CR | CRC | 8CR | 9CR | 17CR | 1MS (slow speed) | 1CR (feed forward) 5CR (table to left) | |

VII

| Switch or Contact Closed | SS2 | 2TRd CRCf | LS3 | LS4 | LS5 | 1TRa 1MFa | CRCa 1a 2TRc 13e 10c 16c 7c 2b } 3b | |
|---|---|---|---|---|---|---|---|---|
| Coils Energized | 13CR | CRC | 8CR | 9CR | 10CR | 1MS (slow speed) | 1CR (feed forward) 3CR (rotate hydro counterclockwise) | |

Positions II–VII repeated until template depresses bar 122 closing LS1.
Closing LS1 starts timing of 1TR—Remainder of cycle as in Chart I.

around until the other side of the tool is parallel to and against the restraining bar and the other radius stop is set, and then set the right and left traverse stops by means of hand wheels 101 and 101a for the desired traverse motion. The tool to be ground is then clamped in the forward fixutre 55 with the proper amount of feed-out adjusted by moving the table longitudinally so that the template tool moves away from the restraining bar by the desired amount. My improved machine is then ready for automatic operation which is initiated merely by depressing the start button 157; inspection of Charts I and II will reveal that closing of the line switch 151 will initially return the table 25 and the fixtures 55 and 56 to the position I regardless of their positions prior thereto.

Referring now particularly to Figs. 6, 19 and 20, the coolant applying system employed with my improved tool grinding machine will be described. The guard member 128 is provided with a protuberance 185 projecting forwardly from wheel 7 and coaxial with its axis of rotation. Disposed within protuberance 185 is a manifold 186 to which a coolant inlet line 187 is connected extending out of the end of protuberance 185. Coolant inlet line 187 is in turn connected to a suitable flexible tubing 188 coupled to a suitable source of coolant (not shown); flexible tubing 188 accommodates the rotational movement of the guard 128 responsive to the side-to-side traversing motion of the table assembly. Extending radially outwardly from manifold 186 are a plurality of coolant applying tubes 189 disposed on either side of the tool receiving opening 129 and arranged to direct coolant onto the working face 13 of wheel 7, as at 190. It is thus seen that coolant is applied to the working face of wheel 7 on either side of the point of engagement with the tool being ground. Thus, the coolant applying tubes 189 effectively spray a substantial volume of coolant onto the working face of the wheel on either side of the tool thereby flooding the tool at the point being ground. In an actual automatic tool grinding machine constructed in accordance with my invention, I have obtained excellent results with a synthetic coolant manufactured by the Master Chemical Company of Toledo, Ohio and bearing the designation Trim 5050; this synthetic coolant, which is second only to brine and tap water for its rate of heat absorption, consists basically of wetting agents with rust inhibitors, germicides, and extreme pressure type synthetic chemicals.

To the best of the applicant's knowledge, rough grinding a carbide tool at a speed of less than 3,000 surface feet per minute, as is done with the novel grinding machine described above, has never before been accomplished. By operating an extremely hard wheel at unusually low speed, rough grinding can be accomplished with the tool form being retained, and when such a wheel is operated at high speed, it laps the tool, providing a fine micro finish. It is common knowledge that the surface speed of a grinding wheel has a direct bearing on the inherent relative hardness or softness characteristics of the wheel. It is general practice to operate a tool-type abrasive grinding wheel, as distinguished from a diamond wheel, at surface speeds in excess of 5000 surface feet per minute; certain resinoid wheels have been operated safely at surface speeds in excess of 10,000 surface feet per minute. A finish lapping operation necessary for the requisite microfinish on the carbide tool is quite different from the heavy hogging-rough grinding operation, and while both operations cannot be performed with the same wheel operating at the same surface speed, I have found that they can both be performed in a highly satisfactory manner with the suitable choice of a wheel operated at high speed for finish lapping, and an unusually low speed for rough grinding. The grinding wheel I have employed in an actual grinding machine constructed in accordance with my invention, is a vitrified bond silicon carbide wheel with an abrasive grit. The safety code in the trade requires that silicon carbide wheels with a vitrified bond should not be operated at speeds in excess of approximately 6500 surface feet per minute. Thus, in order to stay within the safety code, it is required that with such a wheel the finish lapping operation surface speed must be below 6500 surface feet per minute. Therefore, in order to provide the required fast rough stock removing operation, it is necessary to have a wheel which will perform this type of operation satisfactorily at a very slow speed with reference to the lapping speed. The wheel I have used, therefore, and which has provided unusually good results, is a fourteen inch outside diameter, eleven inch inside diameter, by four inch thick, Type 6, plate mounted cylindrical wheel with a forty-six grit, N hard, No. 8 structure. As indicated, I have operated this wheel at a roughing speed of approximately 865 r.p.m. thus providing a surface speed of 2700 surface feet per minute, the finishing speed being twice this fast, i.e., 1730 r.p.m., thus providing a surface speed of 5400 surface feet per minute. With such a wheel incorporated in an actual tool grinding machine constructed in accordance with my invention, I have been able consistently to obtain a twelve through eighteen micro-inch finish on the carbide portion of the tool. More specifically, a tool ¾ inch wide by 1¼ inches high with a carbide tip having an initial configuration similar to Fig. 14 in the drawing, was ground to a final configuration similar to Fig. 12 of the drawing with my improved machine employing the grinding wheel described above in forty-eight seconds, a total of ½ inch of stock having been removed from the end of the tool leaving a surface finish under twenty micro-inches on the carbide section of the tool.

It will be seen that with my improved tool grinding machine, the steel and carbide are ground simultaneously thus eliminating the previous requirement for giving the steel a secondary clearance which weakens the carbide. Thus, my improved tool grinding machine not only grinds carbide tools at a rate far faster than any prior machine or method known to the present applicant, but it further provides a stronger tool by virtue of the elimination of the previously required secondary clearance.

I attribute the remarkably fast grinding action of my improved automatic tool grinding machine and the highly satisfactory finish provided thereby to four major factors: (1) unlimited forward thrust is provided; (2) a substantial side-to-side traversing action is provided with extreme rapidity, the actual grinding machine constructed in accordance with my invention providing an 8½ inch side-to-side traversing stroke at a maximum rate of 200 strokes per minute; (3) the heat resulting from grinding is absorbed throughout the entire formed area of the tool rather than being concentrated on only one side or the other or the radius at any one time as has been prior conventional practice; (4) bringing a substantial volume of coolant directly in to flood the face of the tool as it is being ground.

It will be readily seen that with my improved tool grinding machine, the traversing of the tool being ground completely across the face of the wheel tends to wear the wheel flat rather than to form a groove in the wheel as is the case in certain prior tool grinding machines. It will also be seen that virtually no training or experience is required for operation of my machine, it being only necessary to instruct the operator as to the manner of clamping the tool and the template in the respective fixtures 55 and 56 and adjusting the respective radius stops 75 and 76 and traversing stop hand wheels 101 and 101a.

While my invention has been described and illustrated as embodied in an automatic single point tool grinder and thus an abrasive grinding wheel 7 has been shown, it will be readily understood that my invention is not necessarily limited to abrasive grinding machines and that any other stock removing wheel, such as a milling cutter can be employed in lieu of the abrasive wheel 7. It will also be seen that motion sequences other than those employed in the grinding of the four types of tools shown in Figs. 4 through 11, 14 and 16 through 18, may be employed by revision of the control system, as will be apparent to the man skilled in the art; with the limit switches LS1 through LS9 sensing the positions of the table and fixtures, rearrangement of the contacts associated with the respective relays energized respectively by the limit switches in order to effect the desired automatic programming is well within the skill of a control engineer. It will further be readily understood that other means, such as a gear head electric motor, may be substituted for hydraulic motor 65, and that other means, such as solenoids or pneumatic cylinders may be substituted for hydraulic cylinders 45 and 49.

While I have illustrated and described a specific embodiment of my invention, further modifications and improvements will occur to those skilled in the art and I desire, therefore, in the appended claims to cover all modifications which do not depart from the spirit and scope of my invention.

What is claimed is:

1. A contour forming machine comprising: a stock removing wheel; means operatively connected to said wheel for rotating the same; work supporting means; means for moving said work supporting means transversely from side-to-side; means for moving said work supporting means longitudinally toward and away from said wheel; a pair of holding fixtures pivotally mounted on said work supporting means in spaced apart relation, one of said fixtures being arranged to hold a work piece in stock removing relation to said wheel, the other of said fixtures being arranged to hold template means; means for simultaneously pivoting said fixtures in either direction; and restraining means arranged to cooperate with said template means for limiting removal of stock from said work piece by said wheel to a predetermined amount.

2. A contour forming machine comprising: a stock removing wheel; means operatively connected to said wheel for rotating the same; work supporting means; means for moving said work supporting means transversely from side-to-side; means for moving said work supporting means longitudinally toward and away from said wheel; a pair of holding fixtures pivotally mounted on said work supporting means in spaced apart relation, one of said fixtures being arranged to hold a work piece in stock removing relation to said wheel, the other of said fixtures being arranged to hold template means; means for simultaneously pivoting said fixture in either direction; and restraining means disposed in a plane parallel with and spaced from the plane of said wheel and arranged to cooperate with said template means for limiting removal of stock from said work piece by said wheel to a predetermined amount.

3. A contour forming machine comprising: a stock removing wheel; means operatively connected to said wheel for rotating the same; work supporting means; means for moving said work supporting means transversely from side-to-side; means for moving said work supporting means longitudinally toward and away from said wheel; a pair of holding fixtures pivotally mounted on said work supporting means in spaced apart relation, one of said fixtures being arranged to hold a work piece in stock removing relation to said wheel, the other of said fixtures being arranged to hold template means; means for simultaneously pivoting said fixtures in either direction; restraining means arranged to cooperate with said template means for limiting removal of stock from said work piece by said wheel to a predetermined amount; limit switch means for sensing predetermined pivoted positions of said fixtures; and control means connecting said limit switch means and said fixture pivoting means for programming pivoting of said fixtures.

4. A contour forming machine comprising: a stock removing wheel; means operatively connected to said wheel for rotating the same; work supporting means; means for moving said work supporting means transversely from side-to-side; means for moving said work supporting means longitudinally toward and away from said wheel; a pair of holding fixtures pivotally mounted on said work supporting means in spaced apart relation, one of said fixtures being arranged to hold a work piece in stock removing relation to said wheel, the other of said fixtures being arranged to hold template means; means for simultaneously pivoting said fixtures in either direction; restraining means arranged to cooperate with said template means for limiting removal of stock from said work piece by said wheel to a predetermined amount; limit switch means for sensing predetermined transverse positions of said work supporting means; and control means connecting said limit switch means and said work supporting means; transverse moving means for programming said transverse movement of said work supporting means.

5. A contour forming machine comprising: a stock removing wheel; means operatively connected to said wheel for rotating the same; work supporting means; means for moving said work supporting means transversely from side-to-side; means for moving said work supporting means longitudinally toward and away from said wheel; a pair of holding fixtures pivotally mounted on said work supporting means in spaced apart relation, one of said fixtures being arranged to hold a work piece in stock removing relation to said wheel, the other of said fixtures being arranged to hold template means; means for simultaneously pivoting said fixtures in either direction; restraining means arranged to cooperate with said template means for limiting removal of stock from said work piece by said wheel to a predetermined amount; limit switch means for sensing predetermined longitudinal positions of said work supporting means; and control means connecting said limit switch means and said work supporting means; longitudinal moving means for programming said longitudinal movement of said work supporting means.

6. A contour forming machine comprising: a stock removing wheel; means operatively connected to said wheel for rotating the same; work supporting means; means for moving said work supporting means transversely from side-to-side; means for moving said work supporting means longitudinally toward and away from said wheel; a pair of holding fixtures pivotally mounted on said work supporting means in spaced apart relation, one of said fixtures being arranged to hold a work piece in stock removing relation to said wheel, the other of said fixtures being arranged to hold template means; means for simultaneously pivoting said fixtures in either direction; restraining means arranged to cooperate with said template means for limiting removal of stock from said work piece by said wheel to a predetermined amount; limit switch means for sensing predetermined transverse positions of said work supporting means; limit switch means for sensing predetermined longitudinal positions of said work supporting means; limit switch means for sensing predetermined pivoted positions of said fixtures; and control means connecting all of said limit switch means, and both of said work supporting means, moving means and said fixture pivoting means for programming movement of said work supporting means and pivoting of said fixture.

7. A contour forming machine comprising: a stock removing wheel; means operatively connected to said wheel for rotating the same; work supporting means; first ways supporting said work supporting means for transverse movement from side-to-side; means for moving said work supporting means transversely from side-to-side on said first ways; second ways disposed at right angles to said first ways for supporting said work supporting means for longitudinal movement; means for moving said work supporting means longitudinally toward and away from said wheel on said second ways; a pair of holding fixtures pivotally mounted on said work supporting means in spaced apart relation, one of said fixtures being arranged to hold a work piece in stock removing relation to said wheel, the other of said fixtures being arranged to hold template means; means for simultaneously pivoting said fixture in either direction; limit switch means for sensing predetermined transverse positions of said work supporting means; limit switch means for sensing predetermined pivoted positions of said fixtures; control means connecting said limit switch means and said table transverse moving and fixture pivoting means for programming transverse movement of said table and pivoting of said fixtures; and restraining means disposed in a plane parallel with and spaced from the plane of said wheel and arranged to cooperate with said template means for limiting removal of stock from said work piece by said wheel to a predetermined amount.

8. A contour forming machine comprising: a stock removing wheel; means operatively connected to said wheel for rotating the same; a work supporting table; means for moving said table transversely from side-to-side; means for moving said table longitudinally toward and away from said wheel; a pair of work piece holding fixtures pivotally mounted on said table in spaced apart relationship; one of said fixtures being adapted to hold a work piece to be worked by said wheel, the other of said fixtures being adapted to hold template means; and means for simultaneously pivoting said fixtures in either direction.

9. A contour forming machine comprising: a stock removing wheel; means operatively connected to said wheel for rotating the same; a work supporting table; means for moving said table transversely from side-to-side; means for moving said table longitudinally toward and away from said wheel; a pair of work piece holding fixtures pivotally mounted on said table, one of said fixtures being adapted to hold a work piece to be worked by said wheel, the other of said fixtures being adapted to hold template means; means for simultaneously pivoting said fixtures in either direction; limit switch means for sensing predetermined pivoted positions of said fixtures; limit switch means for sensing predetermined transverse positions of said table; limit switch means for sensing predetermined longitudinal positions of said table, and automatic control means connecting all of said limit switch means, and both said table moving means and said fixture pivoting means for programming movement of said table and pivoting of said fixtures.

10. A contour forming machine comprising: a stock removing wheel; means operatively connected to said wheel for rotating the same; a work supporting table disposed forwardly of said wheel; first ways supporting said table for transverse movement with respect to said wheel; second ways supporting said table for longitudinal movement with respect to said wheel; means operatively connected to said table for moving the same transversely from side-to-side on said first ways; means operatively connected to said table for moving the same longitudinally on said second ways toward and away from said wheel; a pair of work piece holding fixtures pivotally mounted on the upper surface of said table, one of said fixtures being disposed forwardly on said table toward said wheel and being adapted to hold a work piece against the face thereof, the other of said fixtures being disposed rearwardly of said one fixture and being adapted to hold a template piece; and means mounted on said table and operatively connected to said fixtures for simultaneously pivoting the same in either direction.

11. A contour forming machine comprising: a stock removing wheel; means operatively connected to said wheel for rotating the same; a work supporting table disposed forwardly of said wheel and in a plane spaced below the same; first ways supporting said table for transverse movement with respect to said wheel; second ways supporting said table for longitudinal movement with respect to said wheel; means operatively connected to said table for moving the same transversely from side-to-side on said first ways; means operatively connected to said table for moving the same longitudinally on said second ways toward and away from said wheel; a pair of work piece holding fixtures disposed longitudinally on the upper surface of said table, each of said fixtures having its end toward said wheel pivotally connected to said table, the fixture toward said wheel being adapted to hold a work piece against the face of said wheel, the other fixture being adapted to hold a template piece, said table and said one fixture being arranged so that the pivot point of said one fixture extends beneath said wheel when said work piece is in working engagement with the face thereof; and means mounted on said table and operatively connected to said fixtures for simultaneously swinging the same in equal arcs and in either direction about their respective pivot points.

12. A contour forming machine comprising: a stock removing wheel; means operatively connected to said wheel for rotating the same; a work supporting table disposed forwardly of said wheel and in a plane spaced below the same; first ways supporting said table for transverse movement with respect to said wheel; second ways supporting said table for longitudinal movement with respect to said wheel; means operatively connected to said table for moving the same transversely from side-to-side on said first ways; means operatively connected to said table for moving the same longitudinally on said second ways toward and away from said wheel; a pair of work piece holding fixtures disposed longitudinally on the upper surface of said table, each of said fixtures having its end toward said wheel pivotally connected to said table, the fixture toward said wheel being adapted to hold a work piece against the face of said wheel, the other fixture being adapted to hold a template piece, said table and said one fixture being arranged so that the pivot point of said one fixture extends beneath said wheel when said work piece is in working engagement with the face thereof; means mounted on said table and operatively connected to said fixtures for simultaneously swinging the same in equal arcs and in either direction about their respective pivot points; a pair of limit switches respectively arranged to be actuated responsive to the extreme positions of said fixtures; another pair of limit switches respectively arranged to be actuated responsive to the extreme transverse positions of said table; a limit switch arranged to be actuated responsive to a predetermined forward position of said template piece; and automatic control means connected to said limit switches and to said table moving means and to said fixture swinging means for programming movement of said table and said fixtures.

13. A contour forming machine comprising: a stock removing wheel; means operatively connected to said wheel for rotating the same; a work supporting table disposed forwardly of said wheel and in a plane spaced below the same; first ways supporting said table for transverse movement with respect to said wheel; second ways supporting said table for longitudinal movement with respect to said wheel; means operatively connected to said table for moving the same transversely from side-to-side on said first ways; means operatively connected to said table for moving the same longitudinally on said second ways toward and away from said wheel; a pair of work piece holding fixtures disposed longitudinally on the upper surface of said table, each of said fixtures having its end toward said wheel pivotally connected to said table, the fixture toward said wheel being adapted to hold a work piece against the face of said wheel, the other fixture being adapted to hold a template piece, said table and said one fixture being arranged so that the pivot point of said one fixture extends beneath said wheel when said work piece is in working engagement with the face thereof; means mounted on said table and operatively connected to said fixtures for simultaneously swinging the same in equal arcs and in either direction about their respective pivot points; a pair of limit switches respectively arranged to be actuated responsive to the extreme positions of said fixtures; another pair of limit switches respectively arranged to be actuated responsive to the extreme transverse positions of said table; a third pair of limit switches arranged to be actuated responsive to predetermined intermediate transverse positions of said table; a limit switch arranged to be actuated responsive to a predetermined forward position of said template piece; and automatic control means including a selector switch connected to said limit switches, and to said table moving means and to said fixture swinging means for programming predetermined movement cycles for said table and said fixtures.

14. A contour forming machine comprising: a stock removing wheel; a multi-speed electric motor operatively connected to said wheel for rotating the same; a work supporting table; means for moving said table transversely from side-to-side; means for moving said table longitudinally toward and away from said wheel; a work piece holding fixture pivotally mounted on said table; means for pivoting said fixture in either direction; means for sensing a predetermined forward longitudinal position of said table; control means connected to said sensing means and to said motor for operating the same at a first predetermined speed when said table is rearwardly of said predetermined position and at a second predetermined speed when said table reaches said predetermined position.

15. A contour forming machine comprising: a stock removing wheel; a two speed electric motor operatively connected to said wheel for rotating the same; a work supporting table disposed forwardly of said wheel and in a plane spaced below the same; first ways supporting said table for transverse movement with respect to said wheel; second ways supporting said table for longitudinal movement with respect to said wheel; means operatively connected to said table for moving the same transversely from side-to-side on said first ways; means operatively connected to said table for moving the same longitudinally on said second ways toward and away from said wheel; a pair of work piece holding fixtures disposed longitudinally on the upper surface of said table, each of said fixtures having its end toward said wheel pivotally connected to said table, the fixture toward said wheel being adapted to hold a work piece against the face of said wheel, the other fixture being adapted to hold a template piece, said table and said one fixture being arranged so that the pivot point of said one fixture extends beneath said wheel when said work piece is in working engagement with the face thereof; means mounted on said table and operatively connected to said fixtures for simultaneously swinging the same in equal arcs and in either direction about their respective pivot points; a pair of limit switches respectively arranged to be actuated responsive to the extreme positions of said fixtures; another pair of limit switches respectively arranged to be actuated responsive to the extreme transverse positions of said table; a limit switch arranged to be actuated responsive to a predetermined forward position of said template piece; and automatic control means connected to said limit switches and to said table moving means and to said fixture swinging means for programming movement of said table and said fixtures; said control means being connected to said motor and arranged to operate the same at a first lower speed when said template piece is rearwardly of said predetermined forward position and at a second higher speed when said template piece reaches said predetermined forward position.

16. A contour forming machine comprising: a stock removing wheel; an electric motor operatively connected to said wheel for rotating the same; a support for said motor and wheel pivoted on a horizontal axis generally coextensive with the plane of said wheel and adjacent the lower extremity thereof so that said wheel may be tilted about said axis; a work supporting table disposed forwardly of said wheel and in a plane spaced below the same; first ways supporting said table for transverse movement with respect to said wheel; second ways supporting said table for longitudinal movement with respect to said wheel; means operatively connected to said table for moving the same transversely from side-to-side on said first ways; means operatively connected to said table for moving the same longitudinally on said second ways toward and away from said wheel; a pair of work piece holding fixtures disposed longitudinally on the upper surface of said table, each of said fixtures having its end toward said wheel pivotally connected to said table, the fixture toward said wheel being adapted to hold a work piece against the face of said wheel, the other fixture being adapted to hold a template piece, said table and said one fixture being arranged so that the pivot point of said one fixture extends beneath said wheel when said work piece is in working engagement with the face thereof; and means mounted on said table and operatively connected to said fixtures for simultaneously swinging the same in equal arcs and in either direction about their respective pivot points.

17. A contour forming machine comprising: a supporting frame; a stock removing wheel; an electric motor operatively connected to rotate said wheel; a supporting member for said motor and wheel secured to said frame; a work supporting table including upper and lower slide members, said table being disposed forwardly of said wheel with the upper surface of said upper slide member in a horizontal plane spaced below the same; first horizontal transverse ways secured to said frame and supporting said lower slide member for transverse movement with respect to said wheel; second horizontal longitudinal ways secured to said lower slide member and supporting said upper slide member for longitudinal movement with respect to said wheel; means operatively connected to said frame and said lower slide member for moving the same transversely from side-to-side on said first ways; means operatively connected to said lower slide member and said upper slide member for moving the same longitudinally on said second ways toward and away from said wheel; a pair of work piece holding fixtures disposed longitudinally on said upper surface of said upper slide member, each of said fixtures having its end toward said wheel pivotally connected to said upper slide member, the fixture toward said wheel being adapted to hold a work piece against the face of said wheel, the other fixture being adapted to hold a template piece, said upper slide member and said one fixture being arranged so that the pivot point of said one fixture extends beneath said wheel when said work piece is in working engagement with the face thereof; and means mounted on said upper slide member and operatively connected to said fixtures for simultaneously swinging the same in equal arcs in either direction about their respective pivot points.

18. The apparatus of claim 17 further comprising: adjustable means for respectively limiting transverse movement of said lower slide member in each direction; and adjustable means for respectively limiting the swing of said fixtures in each direction.

19. The apparatus of claim 17 in which said lower and upper slide moving means are hydraulic cylinders respectively and said fixture pivoting means is a hydraulic motor.

20. The apparatus of claim 17 further comprising: a pair of limit switches on said upper slide member respectively arranged to be actuated responsive to the extreme positions of said fixtures; a second pair of limit switches on said frame respectively arranged to be actuated responsive to the extreme transverse positions of said lower slide member, a third pair of limit switches on said frame respectively arranged to be actuated responsive to predetermined intermediate transverse positions of said lower slide member; a restraining bar pivotally mounted on said frame, said bar extending transversely over said table and being arranged to be engaged by said template piece in a predetermined longitudinally forward position of said upper slide member; a fourth limit switch on said frame arranged to be actuated by said restraining bar responsive to engagement of said template piece therewith; and automatic control means including a work piece style selector switch connected to said limit switches and to said upper and lower slide moving means and to said fixture pivoting means for programming predetermined movement cycles for said table and said fixtures.

21. The apparatus of claim 1 further characterized in that: said work supporting means transverse moving means is a hydraulic means arranged to provide positive side-to-side traversing of said work supporting means, and said work supporting means longitudinal moving means is hydraulic means arranged to provide soft forward longitudinal movement of said work supporting means toward said wheel and positive rearward longitudinal movement of said work supporting means away from said wheel.

22. The apparatus of claim 21 further comprising: means operatively associated with said table longitudinal moving means for cushioning longitudinally forward movement of said work supporting means toward said wheel until said work piece engages the same.

23. The apparatus of claim 17 in which said lower and upper slide moving means are hydraulic cylinders respectively, and further comprising: restraining means in the hydraulic fluid discharge line of the upper slide member moving cylinder; a limit switch actuated in response to initiation of longitudinally forward movement of said upper slide member and connected to actuate said restraining means thereby to cushion longitudinally forward movement of said upper slide member; and time delay means connected to said limit switch and operable to disable said restraining means and thereby to eliminate said cushioning after a predetermined time.

24. A contour forming machine comprising: a stock removing wheel; a two-speed electric motor operatively connected to said wheel for rotating the same; a work supporting table; means for moving said table transversely from side-to-side; means for moving said table longitudinally toward and away from said wheel; a work piece holding fixture pivotally mounted on said table; means for pivoting said fixture in either direction; a limit switch arranged to be actuated responsive to a predetermined forward longitudinal position of said table; and control means including first time delay means connected to said limit switch and to said motor and arranged to operate said motor at a first predetermined lower speed prior to actuation of said limit switch and to operate said motor at a second predetermined higher speed responsive to actuation of said limit switch after a first predetermined time delay provided by said first time delay means, said control means including second time delay means connected to said first time delay means and to said table longitudinal moving means and arranged to actuate the same to return said table to a predetermined longitudinally rearward position and to return said motor to operation at said first lower speed responsive to expiration of said first time delay and after a second predetermined time delay provided by said second time delay means.

25. The apparatus of claim 17 further comprising: a guard member enclosing the face and periphery of said wheel and rotatably mounted on said frame, said guard member having a window formed therein communicating with the face of said wheel for accommodating said work piece, said guard member being operatively connected to said lower slide member and being rotated thereby responsive to transverse movement thereof.

26. The apparatus of claim 1 further comprising: a guard member enclosing the face and periphery of said wheel with a window formed therein communicating with the face of said wheel for accommodating said work piece; means positioned within said guard member for directing cooling fluid onto said wheel face on either side of said work piece; and means connected to said last named means and extending out of said guard member for supplying cooling fluid thereto.

27. The apparatus of claim 1 further characterized in that said wheel is a cup-shaped abrasive grinding wheel and said work piece holding fixture is adapted to hold a work piece against the face of the rim portion thereof adjacent its lower extremity, and further comprising: a guard member enclosing the face and periphery of said wheel with a window formed therein communicating with the lower extremity of said rim portion of said wheel for accommodating said work piece; a plurality of cooling fluid conduits disposed within said guard member and arranged to direct cooling fluid onto said rim portion face of said wheel; and means connected to said cooling fluid conduits and extending out of said guard member for supplying cooling fluid thereto.

28. The apparatus of claim 17 further characterized in that said wheel is a cup-shaped abrasive grinding wheel and said work piece holding fixture is adapted to hold a work piece against the face of the rim portion thereof adjacent its lower extremity, and further comprising: a guard member enclosing the face and periphery of said wheel with a window formed therein communicating with said lower extremity of said face of said rim portion thereof for accommodating said work piece, said guard member having a protuberance extending outwardly therefrom and coaxial with the axis of said wheel; a manifold member disposed within said protuberance; a cooling fluid supply line connected to said manifold member and extending out of said protuberance for supplying cooling fluid to said manifold; and a plurality of cooling fluid tubes connected to said manifold member and extending radially outwardly therefrom adjacent the inner surface of said guard member, said cooling fluid tubes being arranged to direct cooling fluid onto said face of said rim portion of said wheel on either side of said guard member window.

29. A contour forming machine comprising: a stock removing wheel; means operatively connected to said wheel for rotating the same; work supporting means; means for moving said work supporting means transversely from side-to-side; means for moving said work supporting means longitudinally toward and away from said wheel; a work piece holding fixture pivotally mounted on said work supporting means; means for pivoting said fixture in either direction; means for limiting removal of stock from said work piece by said wheel to a predetermined amount; a guard member enclosing the face and periphery of said wheel with a window formed therein communicating with the face of said wheel for accommodating said work piece; and means for rotating said guard thereby to move said window from side-toside responsive to transverse movement of said work supporting means.

References Cited in the file of this patent

UNITED STATES PATENTS

| | | |
|---|---|---|
| 375,332 | Besson et al. | Dec. 27, 1887 |
| 960,408 | Rowell et al. | June 7, 1910 |
| 974,523 | Roberts et al. | Nov. 1, 1910 |
| 1,401,698 | Herschede et al. | Dec. 27, 1921 |
| 2,475,326 | Johnson | July 5, 1949 |
| 2,538,532 | Oliver | June 16, 1951 |
| 2,544,604 | Mader | Mar. 6, 1951 |

FOREIGN PATENTS

| | | |
|---|---|---|
| 1,088,782 | France | Mar. 10, 1955 |